(12) United States Patent
Inada et al.

(10) Patent No.: US 12,250,475 B2
(45) Date of Patent: Mar. 11, 2025

(54) FILTER ARRAY INCLUDING MULTIPLE TYPES PF FILTERS ARRANGED IN MATRIX AND LIGHT DETECTION SYSTEM INCLUDING THE SAME

(71) Applicant: Panasonic Intellectual Property Management Co., Ltd., Osaka (JP)

(72) Inventors: Yasuhisa Inada, Osaka (JP); Atsushi Ishikawa, Osaka (JP); Motoki Yako, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 17/718,428

(22) Filed: Apr. 12, 2022

(65) Prior Publication Data

US 2022/0239870 A1 Jul. 28, 2022

Related U.S. Application Data

(63) Continuation of application No. PCT/JP2020/037040, filed on Sep. 29, 2020.

(30) Foreign Application Priority Data

Oct. 28, 2019 (JP) ................................ 2019-195668

(51) Int. Cl.
*H04N 25/13* (2023.01)
*G01J 3/28* (2006.01)
(Continued)

(52) U.S. Cl.
CPC .......... *H04N 25/135* (2023.01); *G01J 3/2803* (2013.01); *G01J 3/2823* (2013.01);
(Continued)

(58) Field of Classification Search
CPC ....... G01J 2003/1213; G01J 2003/2806; G01J 2003/2826; G01J 2003/467; G01J 3/26;
(Continued)

(56) References Cited

U.S. PATENT DOCUMENTS

| 2007/0216785 A1 | 9/2007 | Nomura et al. |
| 2009/0321865 A1 | 12/2009 | Kasano et al. |

(Continued)

FOREIGN PATENT DOCUMENTS

| EP | 1686810 A1 | 8/2006 |
| EP | 3557628 A1 | 10/2019 |

(Continued)

OTHER PUBLICATIONS

EPC Office Action dated Nov. 29, 2022 for the related European Patent Application No. 20882949.9.
(Continued)

*Primary Examiner* — Antoinette T Spinks
(74) *Attorney, Agent, or Firm* — Rimon P.C.

(57) ABSTRACT

A filter array according to one aspect of the present disclosure is provided with filters arranged two-dimensionally. The filters include multiple types of first filters having mutually different transmission spectra, of which each transmission spectrum includes first peaks, and multiple types of second filters having mutually different transmission spectra, of which each transmission spectrum includes one or more second peaks. The number of the first peaks in the transmission spectrum of each of the multiple types of first filters is greater than the number of the one or more second peaks in the transmission spectrum of each of the multiple types of second filters, and the multiple types of first filters and the multiple types of second filters are disposed in a mixed arrangement.

14 Claims, 15 Drawing Sheets

(51) Int. Cl.
*G01J 3/51* (2006.01)
*G01J 3/46* (2006.01)

(52) U.S. Cl.
CPC .......... *G01J 3/51* (2013.01); *G01J 2003/2806* (2013.01); *G01J 2003/2826* (2013.01); *G01J 2003/467* (2013.01)

(58) Field of Classification Search
CPC .......... G01J 3/2803; G01J 3/2823; G01J 3/51; G01J 3/513; G02B 5/20; H04N 23/11; H04N 25/135; H04N 5/33
See application file for complete search history.

(56) References Cited

U.S. PATENT DOCUMENTS

| | | | | |
|---|---|---|---|---|
| 2011/0074992 | A1* | 3/2011 | Ajito | ............ G01J 3/36 348/E9.005 |
| 2012/0044394 | A1* | 2/2012 | Komiya | ............ H04N 9/67 348/E9.003 |
| 2013/0077958 | A1* | 3/2013 | Xu | ............ G01J 3/2823 359/359 |
| 2015/0285677 | A1 | 10/2015 | Lee et al. | |
| 2016/0138975 | A1 | 5/2016 | Ando et al. | |
| 2016/0241797 | A1* | 8/2016 | Ye | ............ G02B 30/27 |
| 2017/0005132 | A1 | 1/2017 | Vereecke et al. | |
| 2020/0021782 | A1 | 1/2020 | Sugizaki | |
| 2021/0152790 | A1* | 5/2021 | Sugizaki | ............ H01L 27/14645 |
| 2024/0244655 | A1* | 7/2024 | Ansley | ............ H04L 5/0037 |

FOREIGN PATENT DOCUMENTS

| | | |
|---|---|---|
| JP | 2007-251393 | 9/2007 |
| JP | 2010-011415 | 1/2010 |
| JP | 2012-044519 | 3/2012 |
| JP | 2015-531493 | 11/2015 |
| JP | 2016-156801 | 9/2016 |
| JP | 2018-098341 | 6/2018 |

OTHER PUBLICATIONS

International Search Report of PCT application No. PCT/JP2020/037040 dated Nov. 10, 2020.

* cited by examiner

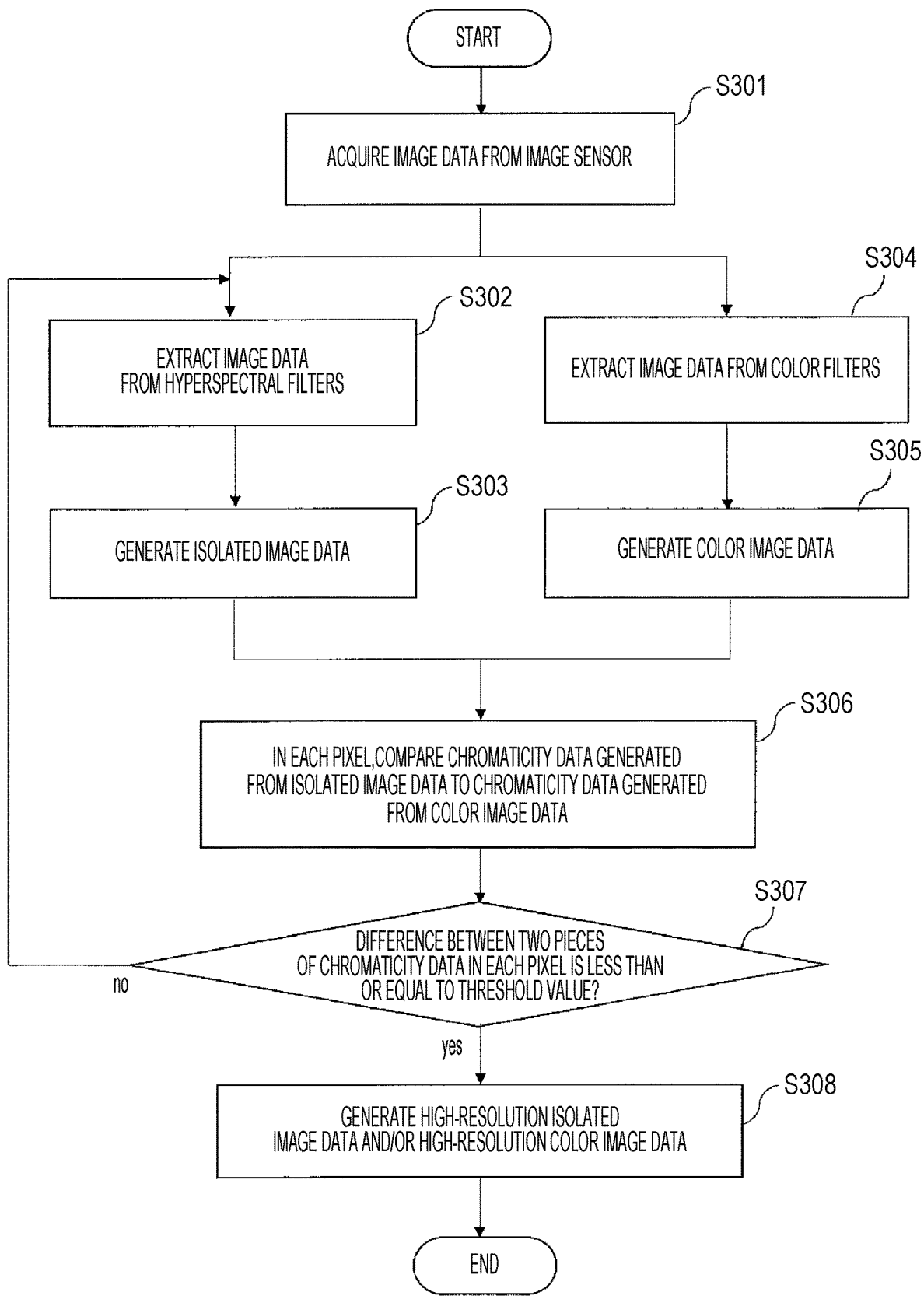

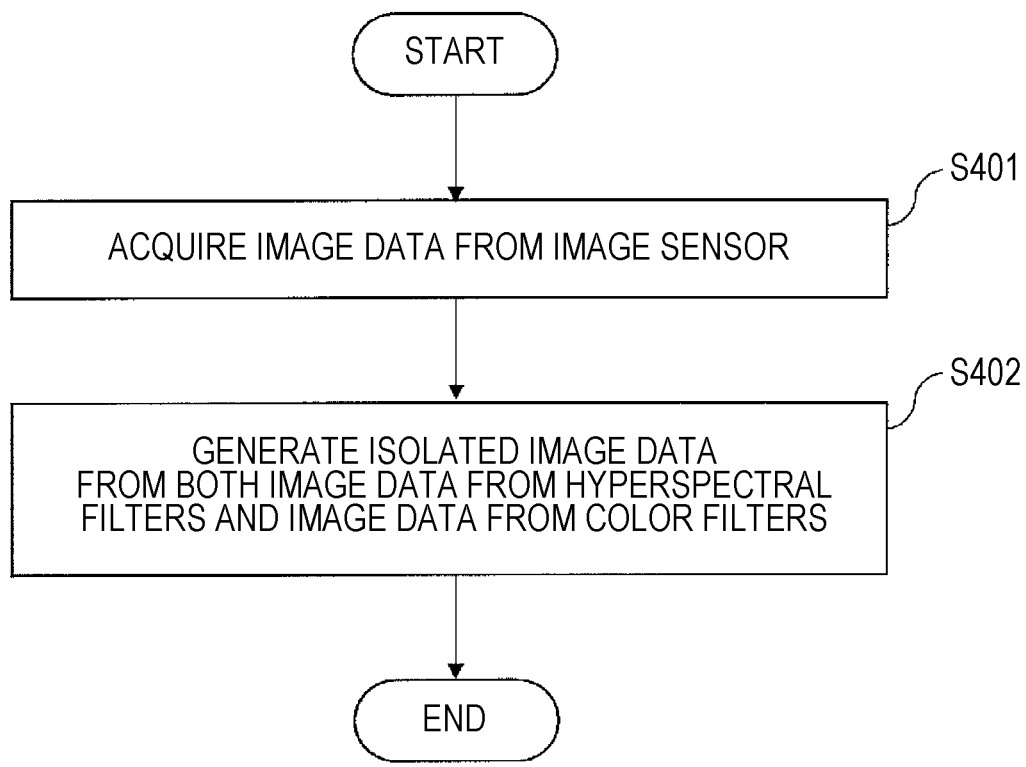

FILTER ARRAY INCLUDING MULTIPLE TYPES PF FILTERS ARRANGED IN MATRIX AND LIGHT DETECTION SYSTEM INCLUDING THE SAME

BACKGROUND

1. Technical Field

The present disclosure relates to a filter array and a light detection system.

2. Description of the Related Art

By utilizing spectral information from many bands, such as several dozen bands for example, each of which is a narrow band, it is possible to ascertain detailed physical properties about an object that would not be possible with an RGB image in the related art. A camera that acquires such information on many wavelengths is referred to as a "hyperspectral camera". Hyperspectral cameras are being used in various fields, such as food inspection, biopsies, drug development, and mineral component analysis. Such technologies are disclosed in U.S. Patent Application No. 2016/138975 and Japanese Unexamined Patent Application Publication No. 2012-044519, for example.

SUMMARY

One non-limiting and exemplary embodiment provides a novel filter array that can generate a hyperspectral image with high wavelength resolution and a color image.

In one general aspect, the techniques disclosed here feature a filter array provided with filters arranged two-dimensionally. The filters include multiple types of first filters having mutually different transmission spectra, of which each transmission spectrum includes first peaks, and multiple types of second filters having mutually different transmission spectra, of which each transmission spectrum includes one or more second peaks. The number of the first peaks in the transmission spectrum of each of the multiple types of first filters is greater than the number of the one or more second peaks in the transmission spectrum of each of the multiple types of second filters, and the multiple types of first filters and the multiple types of second filters are disposed in a mixed arrangement.

According to the technology of the present disclosure, a hyperspectral image with high wavelength resolution and a color image can be generated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is another flowchart of operations for generating image data;

FIG. 10 is yet another flowchart of operations for generating image data;

DETAILED DESCRIPTIONS

Figure 1:
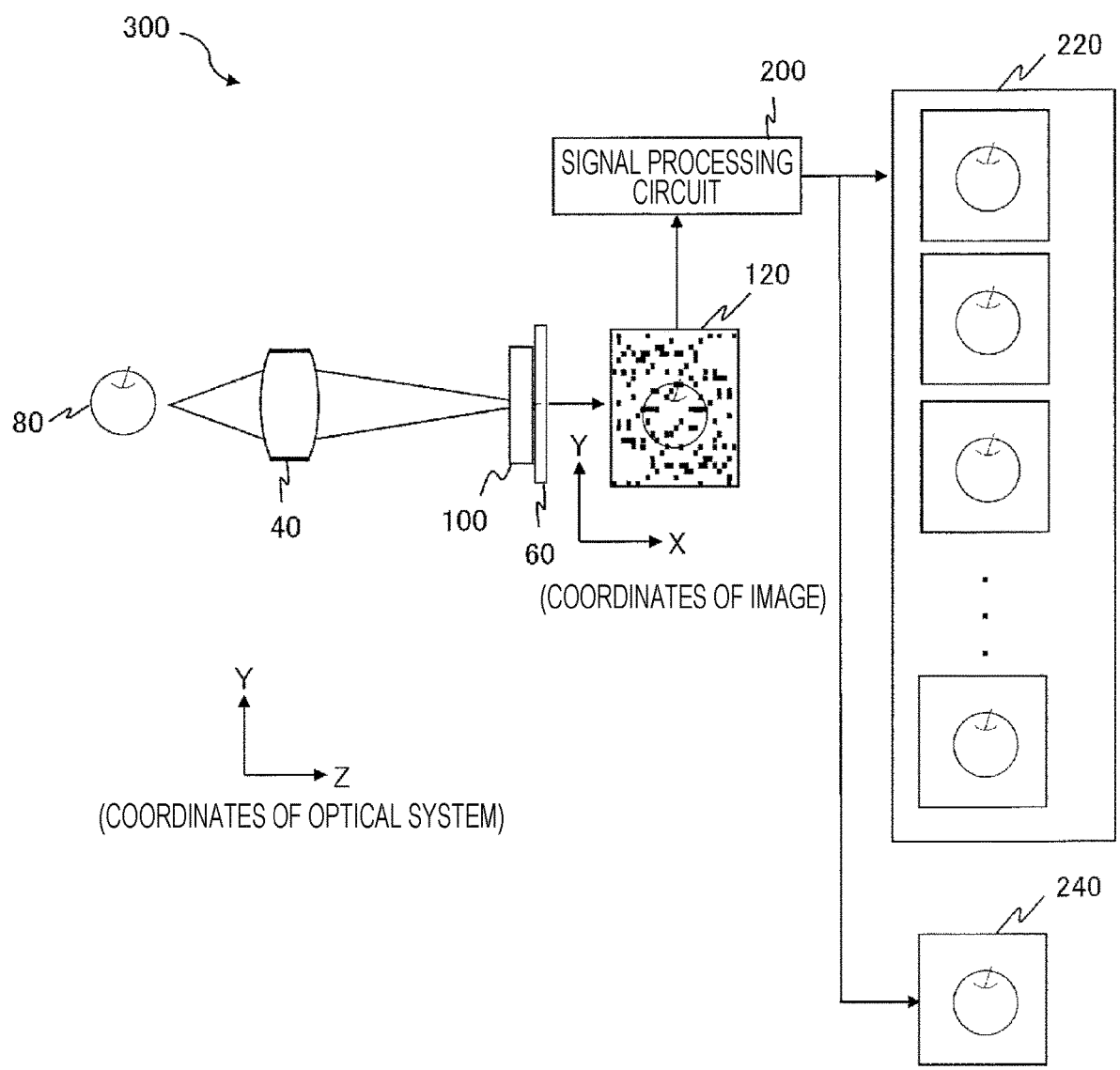
FIG. 1 is a diagram schematically illustrating a light detection system in an exemplary embodiment of the present disclosure.

First, before describing an embodiment of the present disclosure, the imaging apparatus disclosed in U.S. Patent Application No. 2016/138975 will be described briefly. In the apparatus, an image of light from an object is coded and captured by an optical element referred to as a "coding element". With this imaging, a high-resolution, multi-wavelength image can be acquired. Since the coding element includes multiple filters arranged two-dimensionally, in this specification, the coding element is referred to as a "filter array". At least two of the filters in the filter array have mutually different transmission spectra. The transmission spectrum of each of the two filters has a transmittance maximum at multiple peak wavelengths included in a specific wavelength band. In this specification, such a filter is referred to as a "hyperspectral filter". The filters included in the filter array are arranged to correspond respectively with pixels in an image sensor, for example. In imaging using the filter array, the data of each pixel includes information from multiple wavelength bands. In other words, the generated image data is data containing compressed wavelength information. Consequently, it is sufficient to hold two-dimensional data, and the data size can be reduced. For example, it is possible to acquire video image data over a long time, even if the capacity of the recording medium is constrained.

In the filter array according to the present disclosure, the filters arranged two-dimensionally include multiple types of hyperspectral filters and multiple types of color filters, such as an RGB color filter. By performing imaging using the filter array according to the present disclosure, a hyperspectral image with high wavelength resolution and a color image can be generated at the same time.

A filter array according to a first item is provided with filters arranged two-dimensionally. The filters include multiple types of first filters having mutually different transmission spectra, of which each transmission spectrum includes first peaks, and multiple types of second filters having mutually different transmission spectra, of which each transmission spectrum includes one or more second peaks. The number of the first peaks in the transmission spectrum of each of the multiple types of first filters is greater than the number of the one or more second peaks in the transmission spectrum of each of the multiple types of second filters, and the multiple types of first filters and the multiple types of second filters are disposed in a mixed arrangement.

With this filter array, a hyperspectral image with high wavelength resolution can be generated from the multiple types of first filters, and a color image can be generated from the multiple types of second filters.

A filter array according to a second item may be configured such that, in the filter array according to the first item, the number of the first peaks in the transmission spectrum of each of the multiple types of first filters is greater than or equal to 3, and the number of the one or more second peaks in the transmission spectrum of each of the multiple types of second filters is 1 or 2.

With this filter array, more wavelength information can be acquired from the multiple types of first filters than from the multiple types of second filters, such as an RGB filter.

A filter array according to a third item may be configured such that, in the filter array according to the first or second item, the multiple types of second filters are arranged periodically.

With this filter array, a color image can be generated efficiently from the multiple types of second filters.

A filter array according to a fourth item may be configured such that, in the filter array according to any of the first to third items, the multiple types of first filters are arranged aperiodically.

With this filter array, a hyperspectral image can be generated with favorable precision from the multiple types of first filters.

A filter array according to a fifth item may be configured such that, in the filter array according to any of the first to fourth items, the full width at half maximum of each of the first peaks is narrower than the full width at half maximum of each of the one or more second peaks.

With this filter array, more detailed wavelength information can be acquired from the multiple types of first filters than from the multiple types of second filters.

A filter array according to a sixth item may be configured such that, in the filter array according to the fifth item, a wavelength range of at least two of the first peaks in the transmission spectrum of each of the multiple types of first filters overlaps a wavelength range of the one or more second peaks in the transmission spectrum of each of two types among the multiple types of second filters.

With this filter array, chromaticity data generated from a hyperspectral image obtained by the multiple types of first filters approaches chromaticity data generated from color image data obtained by the multiple types of second filters.

A filter array according to a seventh item may be configured such that, in the filter array according to any of the first to sixth items, the transmission spectrum of at least one filter among the multiple types of first filters includes a transmittance maximum in a wavelength band greater than or equal to 700 nm and less than or equal to 2500 nm.

With this filter array, multi-wavelength information in a wavelength band including near-infrared can be acquired.

A filter array according to an eighth item may be configured such that, in the filter array according to any of the first to seventh items, the multiple types of second filters are three types of second filters.

With this filter array, three types of second filters, such as an RGB color filter, can be used.

A filter array according to a ninth item may be configured such that, in the filter array according to the eighth item, the three types of second filters are a red filter, a green filter, and a blue filter.

With this filter array, an RGB color image can be generated. In addition, the transmission spectrum of each of the multiple types of first filters may have multiple transmittance maxima in the near-infrared range greater than or equal to 700 nm and less than or equal to 2500 nm, and the transmission spectrum of each of the multiple types of second filters may have a transmittance maximum in the visible range greater than or equal to 400 nm and less than or equal to 700 nm.

Moreover, the transmission spectrum of each of the multiple types of first filters may have multiple transmittance maxima in the visible range greater than or equal to 400 nm and less than or equal to 700 nm, and the transmission spectrum of each of the multiple types of second filters may have a transmittance maximum in the near-infrared range greater than or equal to 700 nm and less than or equal to 2500 nm.

A filter array according to a 10th item may be configured such that, in the filter array according to any of the first to ninth items, the number of the multiple types of first filters is greater than or equal to 10 types and less than or equal to 50 types of first filters.

With this filter array, a good hyperspectral image can be generated.

A filter array according to an 11th item may be configured such that, in the filter array according to any of the first to 10th items, each of the multiple types of first filters has a resonant structure including a first reflection layer, a second reflection layer, and an intermediate layer between the first reflection layer and the second reflection layer.

With this filter array, the transmission spectrum of each of the multiple types of first filters has multiple peaks included in a specific wavelength band.

A light detection system according to a 12th item is provided with a filter array according to any of the first to 11th items, an image sensor including light detecting elements, and a signal processing circuit. Each of the light detecting element is disposed at a position for receiving light transmitted through a corresponding filter from among the filters. The signal processing circuit generates first image data in accordance with first detection signals from the light detecting elements that receive light transmitted through the multiple types of first filters from among the light detecting elements, and generates second image data in accordance with second detection signals from the light detecting elements that receive light transmitted through the multiple types of second filters from among the light detecting elements.

With this light detection system, a hyperspectral image with high wavelength resolution and a color image can be generated.

A light detection system according to a 13th item may be configured such that, in the filter array according to the 12th item, the signal processing circuit generates first chromaticity data in accordance with the first image data and generates second chromaticity data in accordance with the second image data, and the first chromaticity data and the second chromaticity data substantially match in each of the light detecting elements.

With this light detection system, a high-resolution hyperspectral image and a high-resolution color image can be generated.

In the present disclosure, all or part of the circuits, units, devices, members, or sections, or all or part of the function blocks in the block diagrams, may be executed by one or multiple electronic circuits, including a semiconductor device, a semiconductor integrated circuit (IC), or a large-scale integration (LSI), for example. An LSI or IC may be integrated into a single chip, or may be configured by combining multiple chips. For example, function blocks other than memory elements may be integrated into a single chip. Although referred to as an LSI or IC herein, such electronic circuits may also be called a system LSI, a very large-scale integration (VLSI), or an ultra-large-scale integration (VLSI), depending on the degree of integration. A field-programmable gate array (FPGA) programmed after fabrication of the LSI, or a reconfigurable logic device in which interconnection relationships inside the LSI may be reconfigured or in which circuit demarcations inside the LSI may be set up, may also be used for the same purpose.

Furthermore, the function or operation of all or part of a circuit, unit, device, member, or section may be executed by software processing. In this case, the software is recorded onto a non-transitory recording medium, such as one or multiple ROM modules, optical discs, or hard disk drives, and when the software is executed by a processor, the function specified by the software is executed by the processor and peripheral devices. A system or device may also be provided with one or multiple non-transitory recording media on which the software is recorded, a processor, and necessary hardware devices, such as an interface, for example.

Hereinafter, a more specific embodiment of the present disclosure will be described with reference to the drawings. However, a description that is more detailed than necessary may be omitted in some cases. For example, a detailed description of matter that is already well-known may be omitted, and a duplicate description may be omitted for configurations which are substantially the same. This is to keep the following description from becoming unnecessarily verbose, and to make the description easy to understand for a person skilled in the art. Note that the inventors provide the attached drawings and the following description to enable a person skilled in the art to sufficiently understand the present disclosure, and these drawings and description are not intended to limit the subject matter of the claims. In the following description, identical or similar components are denoted by the same reference signs.

Embodiment

<Light Detection System>

First, a light detection system according to an embodiment of the present disclosure will be described.

FIG. 1 is a diagram schematically illustrating a light detection system 300 in an exemplary embodiment of the present disclosure. The light detection system 300 is provided with an optical system 40, a filter array 100, an image sensor 60, and a signal processing circuit 200. The optical system 40, the filter array 100, and the image sensor 60 are disposed on a path of light incident from an object 80.

The filter array 100 includes light-transmissive filters arranged in rows and columns. The filter array 100 is an optical element in which the transmission spectrum of the light, or in other words the wavelength dependency of the light transmittance, is different depending on the filter. The filter array 100 allows incident light to pass through while modulating the intensity of the light. Details of the filter array 100 will be described later. The filter array 100 may be disposed near, or directly on, the image sensor 60. Here, "near" means that an image of light from the optical system 40 is close enough to be formed on the surface of the filter array 100 in a distinct state to some degree. Also, "directly on" means so close that there is almost no gap between the two. The filter array 100 and the image sensor 60 may also be integrated.

The optical system 40 includes at least one lens. In FIG. 1, the optical system 40 is illustrated as a single lens, but the optical system 40 may also be formed by a combination of multiple lenses. The optical system 40 forms an image on the imaging surface of the image sensor 60 through the filter array 100.

The image sensor 60 is provided with light detecting elements. Each light detecting element is disposed facing one of the filters. Each light detecting element is sensitive to light in a specific wavelength band. The specific wavelength band is a wavelength band determined according to the purpose. Note that in the present disclosure, being "sensitive to light in a certain wavelength band" refers to having a substantial sensitivity necessary to detect light in the wavelength band, and for example, refers to having an external quantum efficiency higher than or equal to 1% in the wavelength band. The external quantum efficiency of the light detecting elements may be higher than or equal to 10%. The external quantum efficiency of the light detecting elements may also be higher than or equal to 20%. In the following description, the light detecting elements are also referred to as "pixels".

The filter array 100 and the image sensor 60 may also be separate. Even in this case, each light detecting element is disposed at a position for receiving light transmitted through one of the filters. The components may also be arranged such that the light transmitted through the filters is respectively incident on the light detecting elements through a mirror. In this case, each light detecting element is not disposed directly underneath one of the filters.

The signal processing circuit 200 generates pieces of isolated image data 220 including multi-wavelength information and pieces of color image data 240 including RGB information in accordance with image data 120 acquired by the image sensor 60. Details of a method for processing an image signal in the signal processing circuit 200 will be described later. Note that the signal processing circuit 200 may be built into the image sensor 60, or may be a component of a signal processing device that is electrically coupled to the image sensor 60 in a wired or wireless way.

<Filter Array>

Hereinafter, FIGS. 2A to 2D will be referenced to describe the filter array 100 according to the present embodiment. The filter array 100 is used in a spectroscopic system that generates images for each of the wavelength bands included in a specific wavelength band. In this specification, the specific wavelength band is also referred to as the "target wavelength band". The filter array 100 is disposed on the path of light incident from the object 80, and outputs the incident light while modulating the intensity of the light on each wavelength. This process by the filter array is referred to as "coding" in this specification.

Figure 2A:
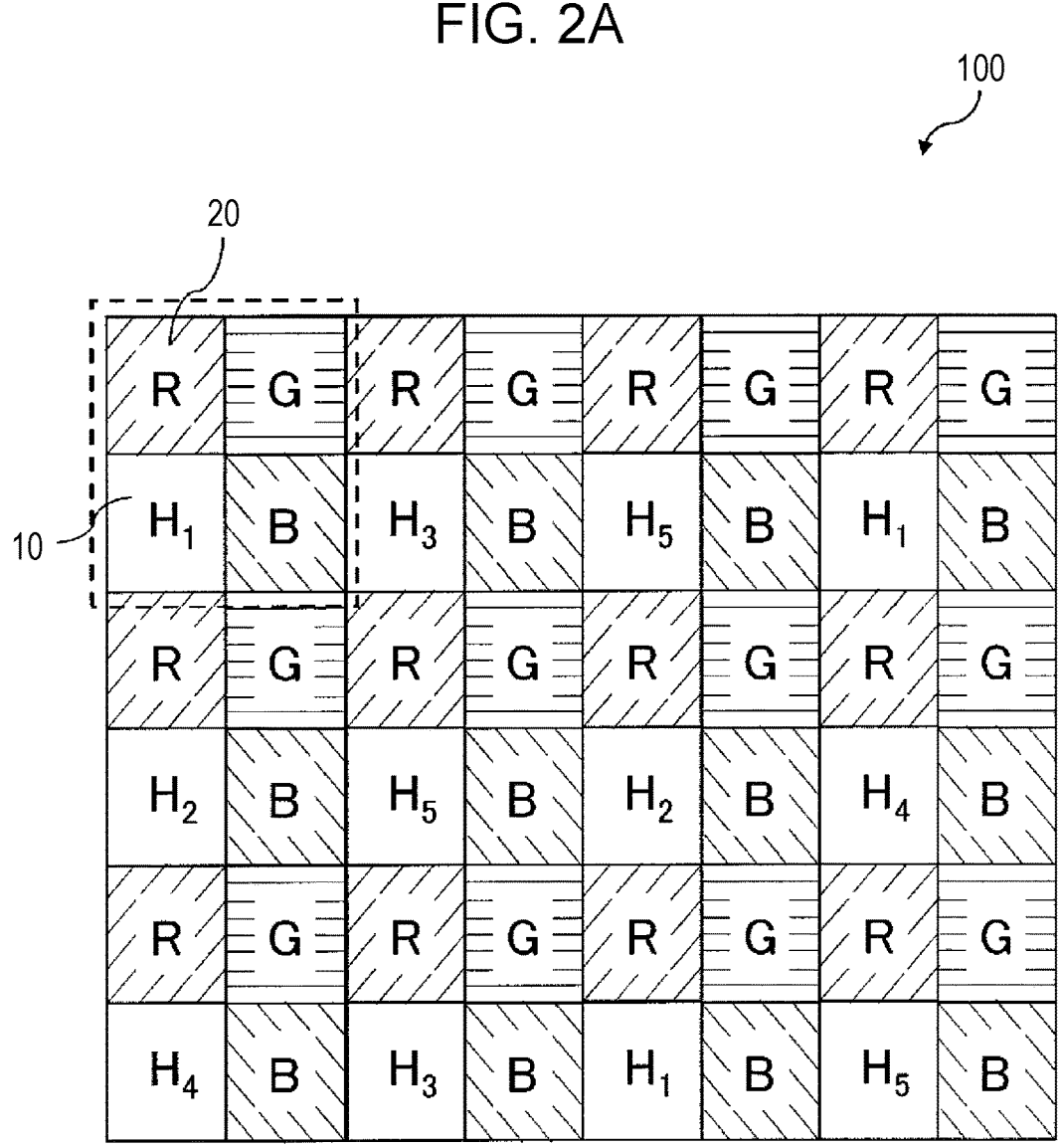
FIG. 2A is a diagram schematically illustrating an example of a filter array in the present embodiment.

FIG. 2A is a diagram schematically illustrating an example of the filter array 100 in the present embodiment. The filter array 100 includes filters arranged two-dimensionally. In this specification, the filters are also referred to as "cells". Each filter has an individually set transmission spectrum. The transmission spectrum is expressed as a function $T(\lambda)$, where $\lambda$ is the wavelength of the incident light. The transmission spectrum $T(\lambda)$ may take a value greater than or equal to 0 and less than or equal to 1. Details of the filter configuration will be described later.

In the example illustrated in FIG. 2A, the filter array 100 includes 48 square filters arranged into 6 rows and 8 columns. The above is merely an example, and more filters may be provided in actual applications. The number may be approximately the same as the number of pixels in a typical light detector such as an image sensor, for example. The number of pixels is from several hundreds of thousands to several tens of millions, for example. In one example, the filter array 100 may be disposed directly on a light detector, and each filter may be disposed to correspond to a single pixel of the light detector. Each filter faces one pixel of the light detector, for example.

In the example illustrated in FIG. 2A, the filters in the filter array 100 include five types of hyperspectral filters 10 having mutually different transmission spectra and three types of color filters 20 having mutually different transmission spectra. The five types of hyperspectral filters 10 correspond to the multiple types of first filters in the present disclosure, and the three types of color filters 20 correspond to the multiple types of second filters in the present disclosure. The five types of hyperspectral filters 10 are referred to as the $H_1$ filter, $H_2$ filter, $H_3$ filter, $H_4$ filter, and $H_5$ filter. The three types of color filters 20 are a red filter that transmits red light, a green filter that transmits green light, and a blue filter that transmits blue light. In this specification, the red filter, green filter, and blue filter are referred to as the "R filter", "G filter", and "B filter", respectively.

Figure 2B:
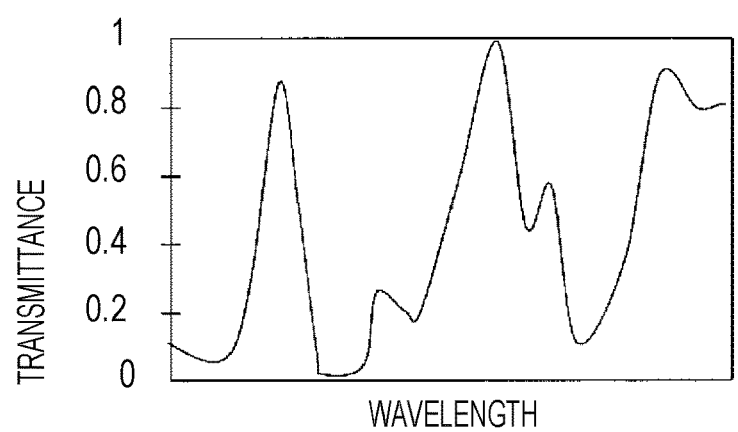
FIG. 2B is a diagram schematically illustrating an example of the transmission spectrum of an $H_1$ filter in the filter array of FIG. 2A.
Figure 2C:
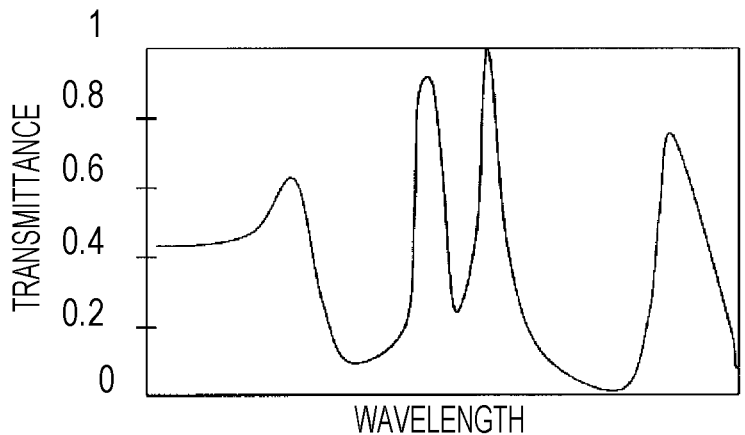
FIG. 2C is a diagram schematically illustrating an example of the transmission spectrum of an $H_2$ filter in the filter array of FIG. 2A.

FIGS. 2B and 2C are diagrams schematically illustrating examples of the transmission spectra of the $H_1$ filter and the $H_2$ filter in the filter array 100 of FIG. 2A. The transmission spectrum of the $H_1$ filter and the transmission spectrum of the $H_2$ filter are different from each other. Furthermore, the transmission spectrum of each of the two filters has a transmittance maximum at multiple peak wavelengths included in the target wavelength band. The same applies to the remaining $H_3$ to $H_5$ filters.

Figure 2D:
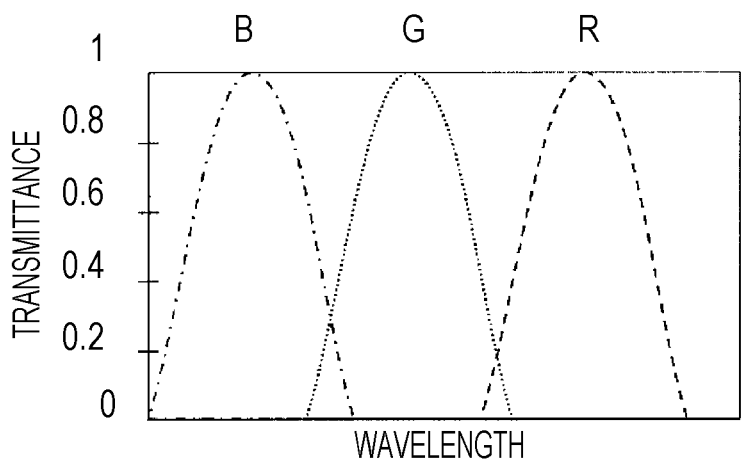
FIG. 2D is a diagram schematically illustrating an example of the transmission spectra of an R filter, a G filter, and a B filter in the filter array of FIG. 2A.

FIG. 2D is a diagram schematically illustrating an example of the transmission spectra of the R filter, G filter, and B filter in the filter array 100 of FIG. 2A. In the example illustrated in FIG. 2D, the dashed line, the dotted line, and the chain line represent single peaks in the transmission spectra of the R filter, G filter, and B filter, respectively. The R filter mainly transmits light in the red wavelength band (for example, greater than or equal to 600 nm and less than or equal to 700 nm). The G filter mainly transmits light in the green wavelength band (for example, greater than or equal to 500 nm and less than or equal to 600 nm). The B filter mainly transmits light in the blue wavelength band (for example, greater than or equal to 400 nm and less than or equal to 500 nm). The three types of color filters 20 may also have transmission characteristics different from R, G, and B filters. For example, the three types of the color filters 20 may also be a C filter that mainly transmits cyan light, which is a mixture of green and blue, an M filter that mainly transmits magenta light, which is a mixture of red and blue, and a Y filter that mainly transmits yellow light, which is a mixture of red and green. In this way, the transmission spectrum of each of the three types of color filters 20 has a transmittance maximum at one or more peak wavelengths included in the target wavelength band. The transmission spectrum of each of the R, G, and B filters has a transmittance maximum at one peak wavelength included in the target wavelength band. The transmission spectrum of each of the C, M, and Y filters has transmittance maxima at two peak wavelengths included in the target wavelength band.

FIG. 2A will be referenced again. In the example illustrated in FIG. 2A, unit blocks including four filters enclosed by the thick dashed line are arranged two-dimensionally. Each unit block includes the R filter, the G filter, the B filter, and one of the filters $H_1$ to $H_5$. Each unit block is obtained by taking what is called a Bayer array formed using an R filter, two G filters, and a B filter, and replacing one of the G filters with one of the filters $H_1$ to $H_5$. In each unit block, the hyperspectral filters 10 and the color filters 20 are mixed in a 1:3 ratio. In this specification, "mixed" means a state in which one or more hyperspectral filters 10 are interposed between two color filters 20 in the row direction or the column direction, or a state in which one or more color filters 20 are interposed between two hyperspectral filters 10 in the row direction or the column direction. In the filter array 100 according to the present embodiment, the five types of the hyperspectral filters 10 are arranged aperiodically, while the three types of the color filters 20 are arranged regularly.

As above, the filter array 100 according to the present embodiment includes multiple types of hyperspectral filters 10 and multiple types of color filters 20. The multiple types of hyperspectral filters 10 may be configured from among a number of types of hyperspectral filters 10 greater than or equal to 10 types and less than or equal to 50 types depending on the purpose, for example. If more types of hyperspectral filters 10 are used, more multi-wavelength information can be acquired. For example, useful multi-wavelength information can be acquired with 16 types of hyperspectral filters 10. Also, 32 types of hyperspectral filters 10 may be used. The multiple types of color filters 20 may be three types of color filters 20 like the R, G, and B filters or the C, M, and Y filters described above, or may be a transparent (white) region without a color filter, for example. Moreover, color filters having transmission characteristics different from the above are also possible. The number of peak wavelengths in the transmission spectrum of each of the multiple types of hyperspectral filters 10 is greater than the number of peak wavelengths in the transmission spectrum of each of the multiple types of color filters 20.

Note that, depending on the purpose, a part of the filter array 100 according to the present embodiment may also include a filter that does not have a wavelength-dependent light transmittance, such as a transparent filter or a neutral density (ND) filter.

Figure 3A:
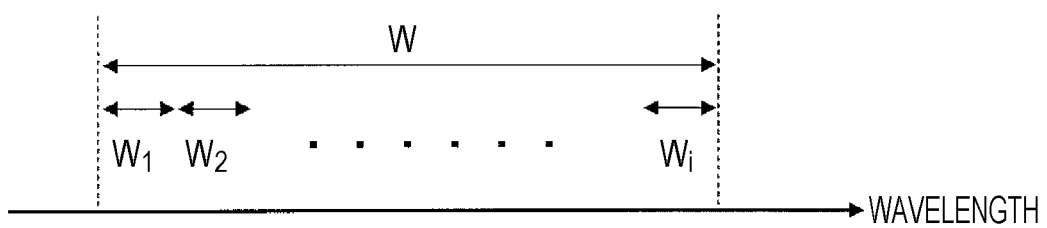
FIG. 3A is a diagram for explaining an example of the relationship between a target wavelength band W and wavelength bands $W_1, W_2, \ldots, W_i$ included therein.
Figure 3B:
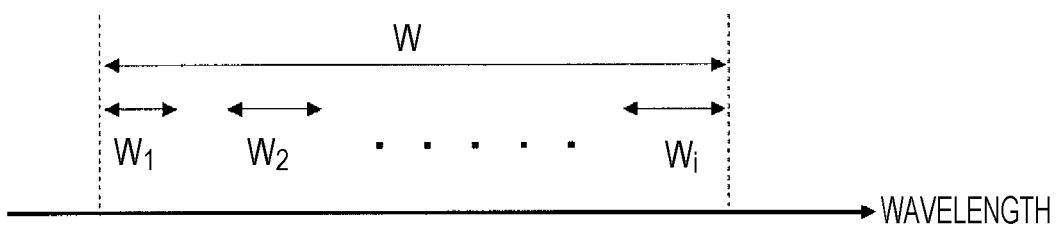
FIG. 3B is a diagram for explaining another example of the relationship between the target wavelength band W and the wavelength bands $W_1, W_2, \ldots, W_i$ included therein.

Next, FIGS. 3A to 4B will be referenced to describe details of the target wavelength band and the transmission spectra of the hyperspectral filters 10. FIGS. 3A and 3B are diagrams for explaining an example of the relationship between a target wavelength band W and wavelength bands $W_1$, $W_2$, ..., $W_i$ included therein. The target wavelength band W may be set to various ranges depending on the purpose. The target wavelength band W may be the visible light wavelength band greater than or equal to approximately 400 nm and less than or equal to approximately 700 nm, the near-infrared wavelength band greater than or equal to approximately 700 nm and less than or equal to approximately 2500 nm, or the near-ultraviolet wavelength band greater than or equal to approximately 10 nm and less than or equal to approximately 400 nm, for example, but otherwise may be mid-infrared, far-infrared, or a radio wave band such as terahertz waves or millimeter waves. Alternatively, the target wavelength band W may be a wavelength band that includes visible light and near-infrared, greater than or equal to approximately 400 nm and less than or equal to approximately 900 nm. In this way, the wavelength band to be used is not necessarily the visible light band. In this specification, the term "light" is used out of convenience to refer to not only visible light but also non-visible light such as near-ultraviolet rays, near-infrared rays, and radio waves.

In the example illustrated in FIG. 3A, the target wavelength band W is subdivided into i equal segments designated the wavelength band $W_1$, wavelength band $W_2$, ..., wavelength band $W_i$, where i is any integer greater than or equal to 4. However, the configuration is not limited to such an example. The wavelength bands included in the target wavelength band W may be set in any way. For example, the bandwidths may be non-uniform depending on the wavelength band. There may also be gaps between adjacent wavelength bands. In the example illustrated in FIG. 3B, the bandwidth is different depending on the wavelength band, and there is a gap between two adjacent wavelength bands. In this way, the wavelength bands may be determined in any way insofar as the wavelength bands are different from each other. The number of wavelength divisions i may also be less than or equal to 3.

Figure 4A:
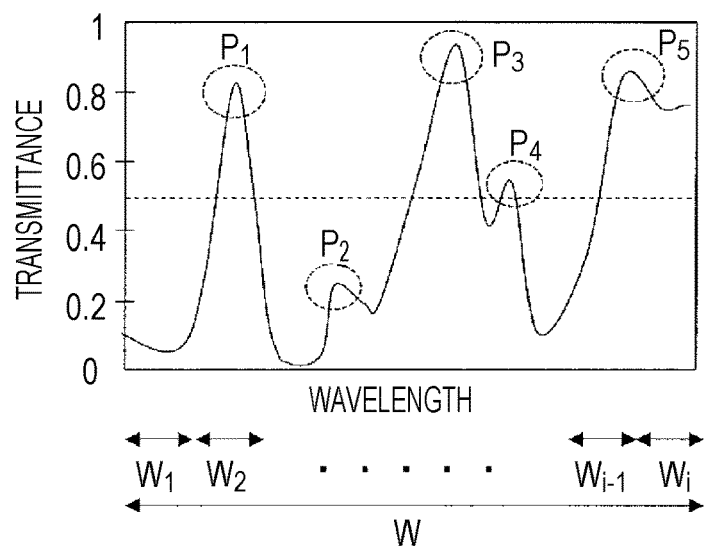
FIG. 4A is a diagram for explaining the properties of the transmission spectrum of a hyperspectral filter in the filter array.

FIG. 4A is a diagram for explaining the properties of the transmission spectrum of the hyperspectral filters 10 in the filter array 100. In the example illustrated in FIG. 4A, the transmission spectrum has transmittance maxima $P_1$ to $P_5$ and transmittance minima in relation to the wavelength within the target wavelength band W. In the example illustrated in FIG. 4A, the transmittance within the target wavelength band W is normalized to a maximum of 1 and a minimum of 0. In the example illustrated in FIG. 4A, the transmission spectrum has maxima in the wavelength band W and the wavelength band $W_{i-1}$. In this way, in the present embodiment, the transmission spectrum of each hyperspectral filter 10 has transmittance maxima in at least two wavelength bands among the wavelength bands $W_1$ to $W_i$. As FIG. 4A demonstrates, the maxima $P_1$, $P_3$, $P_4$, and $P_5$ are greater than or equal to 0.5.

As above, the light transmittance of each hyperspectral filter 10 is different depending on the wavelength. Consequently, the filter array 100 transmits more of the component of the incident light in certain wavelength bands and less of the component in other wavelength bands. For example, the normalized transmittance may be greater than 0.5 for the light in k wavelength bands among the i wavelength bands, while the normalized transmittance may be less than or equal to 0.5 for the light in the remaining i-k wavelength bands. Here, k is an integer satisfying $2 \leq k < i$. In the hypothetical case where the incident light is white light containing uniform wavelength components across all visible light, the hyperspectral filters 10 in the filter array 100 would modulate, through each filter, the incident light into light having strong, discrete peaks with respect to wavelength, and output a superposition of the light at these wavelengths.

Figure 4B:
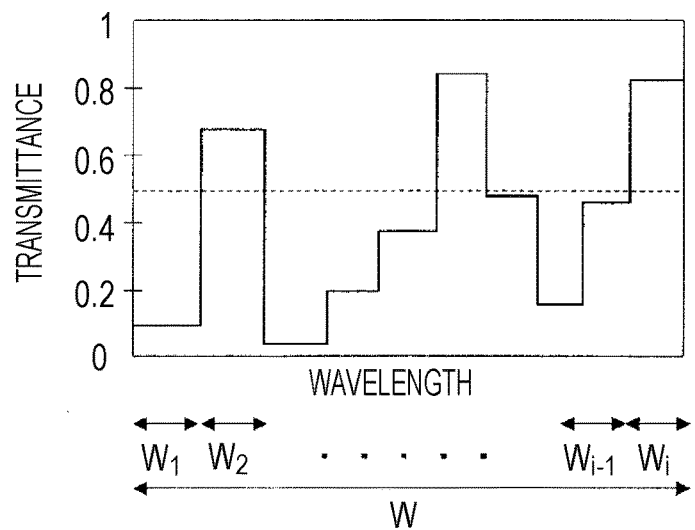
FIG. 4B is a diagram illustrating an example in which the transmission spectrum of FIG. 4A is averaged for each of the wavelength bands $W_1, W_2, \ldots, W_i$.

FIG. 4B is a diagram illustrating an example in which the transmission spectrum of FIG. 4A is averaged for each of the wavelength bands $W_1$, $W_2$, ..., $W_i$. The averaged transmittance is obtained by integrating the transmission spectrum $T(\lambda)$ over each wavelength band and dividing by the bandwidth of the wavelength band. In this specification, the value of the transmittance averaged for each wavelength band in this way is referred to as the transmittance for that wavelength band. In this example, the transmittance peaks higher in the three wavelength bands taking the maxima $P_1$, $P_3$, and $P_5$. In particular, the normalized transmittance exceeds 0.8 in the two wavelength bands taking the maxima $P_3$ and $P_5$.

In this specification, a raised shape in the transmission spectrum is referred to as a "peak". Also, the wavelength at which the transmittance expresses a maximum within a raised shape is referred to as the "peak wavelength". The transmittance at the peak wavelength is different enough from the nearby transmittance for each filter to function substantially as a transmissive spectral filter. For example, in the case where the difference between the normalized transmittance at a maximum and the normalized transmittance of each of two minima positioned on either side of the maximum is greater than 0.5, the wavelength of the maximum may be called a "peak wavelength".

Details of the hyperspectral filters 10 are disclosed in U.S. Patent Application No. 2016/138975, the entire disclosure of which is incorporated herein by reference.

Figure 5A:
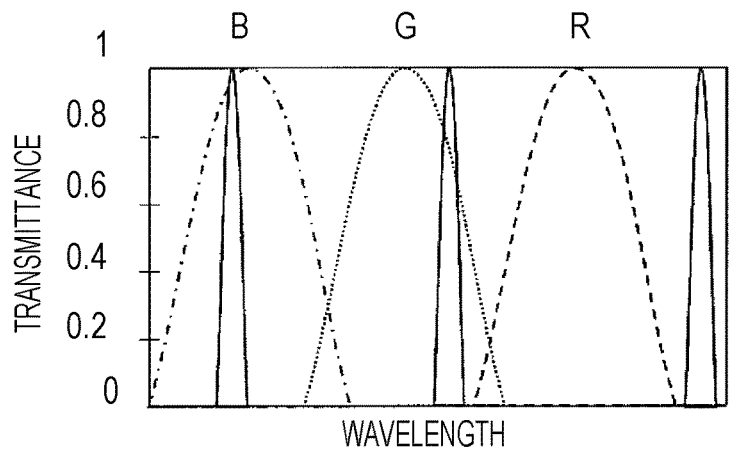
FIG. 5A is a diagram schematically illustrating an example of the transmission spectra of the hyperspectral filter and the color filter.
Figure 5B:
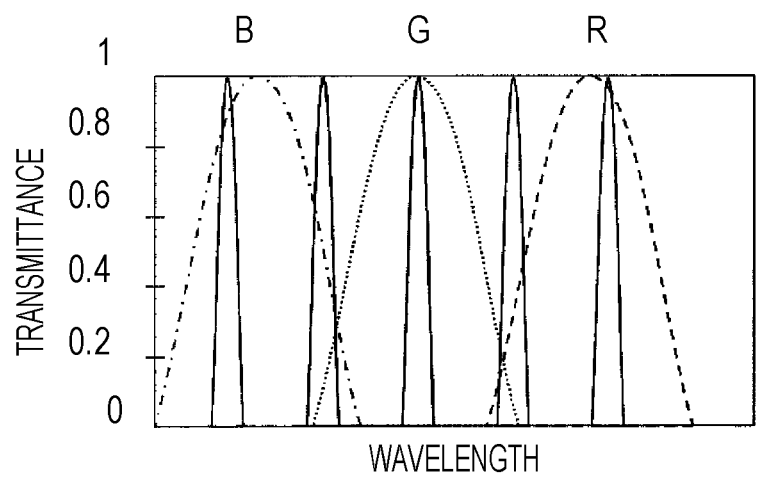
FIG. 5B is a diagram schematically illustrating another example of the transmission spectra of the hyperspectral filter and the color filter.

Next, FIGS. 5A and 5B will be referenced to describe the relationship between the transmission spectra of the hyperspectral filters 10 and the transmission spectra of the color filters 20. FIGS. 5A and 5B are diagrams schematically illustrating an example of the transmission spectra of the hyperspectral filters 10 and the color filters 20. The solid lines in FIGS. 5A and 5B represent the peaks in the transmission spectra of the hyperspectral filters 10. The full width at half maximum of each of the peaks in the transmission spectra of the hyperspectral filters 10 is narrower than the full width at half maximum of the peaks in the transmittance of the color filters 20. From such hyperspectral filters 10, more detailed wavelength information than from the color filters 20 can be obtained.

In the example illustrated in FIG. 5A, two of the peaks in the transmission spectra of the hyperspectral filters 10 overlap the single peak in the transmission spectrum of each of two of the three types of color filters 20. When the isolated image data 220 is acquired from the hyperspectral filters 10 having such transmission spectra and chromaticity data is generated from the isolated image data 220, the chromaticity data is close to the chromaticity data generated from the color image data 240. The chromaticity data is expressed in the CIE color specification system, for example. Two pieces of different chromaticity data being close means that the relative error between the two pieces of different chromaticity data is within 30%.

In the example illustrated in FIG. 5B, all of the peaks in the transmission spectra of the hyperspectral filters 10 overlap the single peaks in the transmission spectra of all three types of color filters 20. When the isolated image data 220 is acquired from the hyperspectral filters 10 having such transmission spectra and chromaticity data is generated from the isolated image data 220, the chromaticity data substantially matches the chromaticity data generated from the color image data 240. Two pieces of different chromaticity data substantially matching means that the relative error between the two pieces of different chromaticity data is within 10%.

FIG. 5A will be referenced again. As illustrated in FIG. 5A, in some cases, at least one of the peaks in the transmission spectra of the hyperspectral filters 10 may not overlap any of the peaks of the three types of color filters 20. The transmission spectrum of at least one of the multiple types of hyperspectral filters 10 may have a transmittance maximum at a peak wavelength in the near-infrared wavelength band greater than or equal to 700 nm and less than or equal to 900 nm, for example. From such a hyperspectral filter 10, isolated image data containing near-infrared wavelength information can be acquired.

In the filter array 100 according to the present embodiment, the number of types of hyperspectral filters 10 is roughly the same as the number of wavelength bands in the target wavelength band. If the number of types of the hyperspectral filters 10 is fewer than the number of wavelength bands in the target wavelength band, the accuracy of the generated isolated image data may be reduced.

<Signal Processing Circuit>
[Image Data Generation Method 1]

Figure 6:
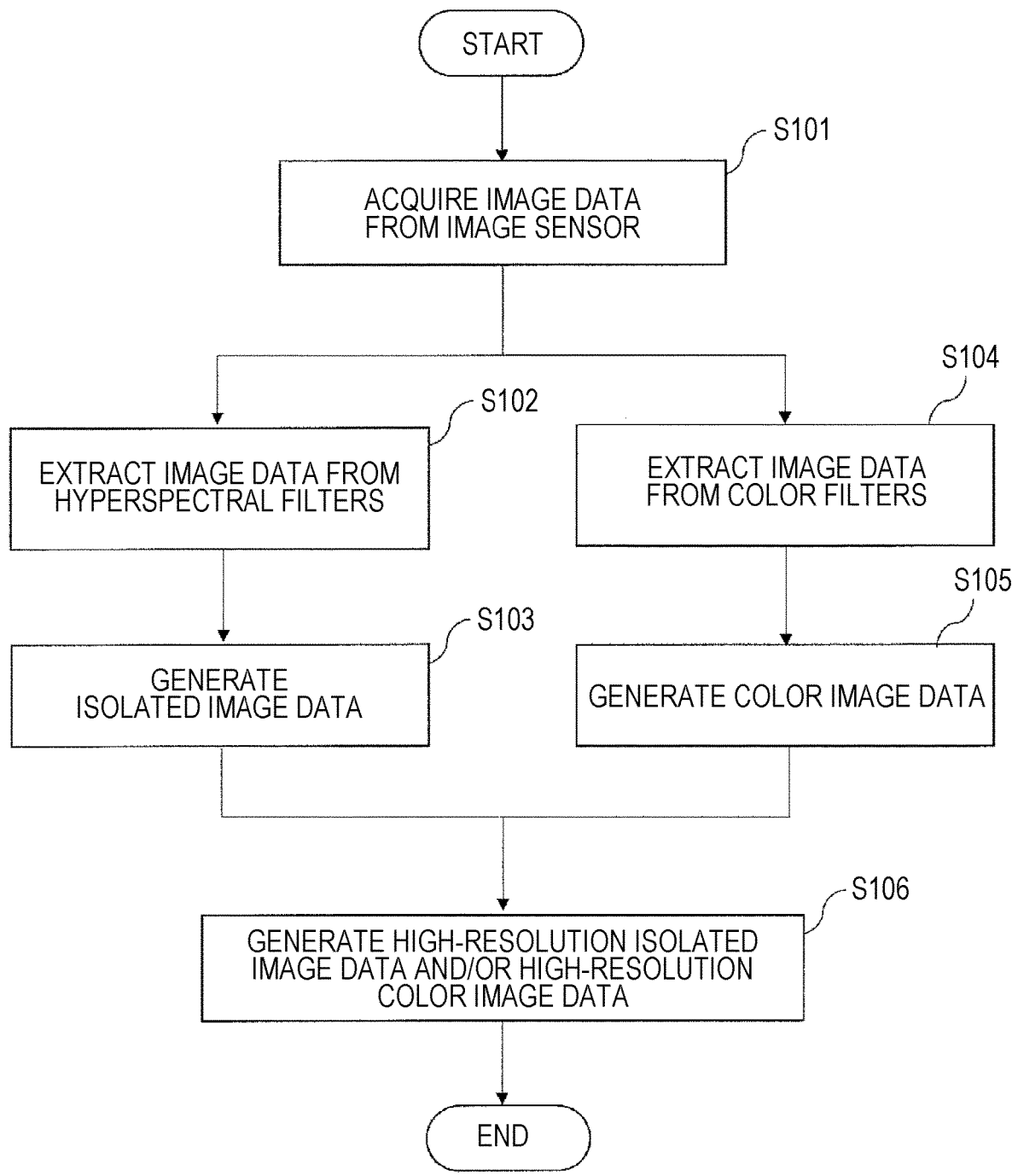
FIG. 6 is a flowchart of operations for generating image data.
Figure 7:
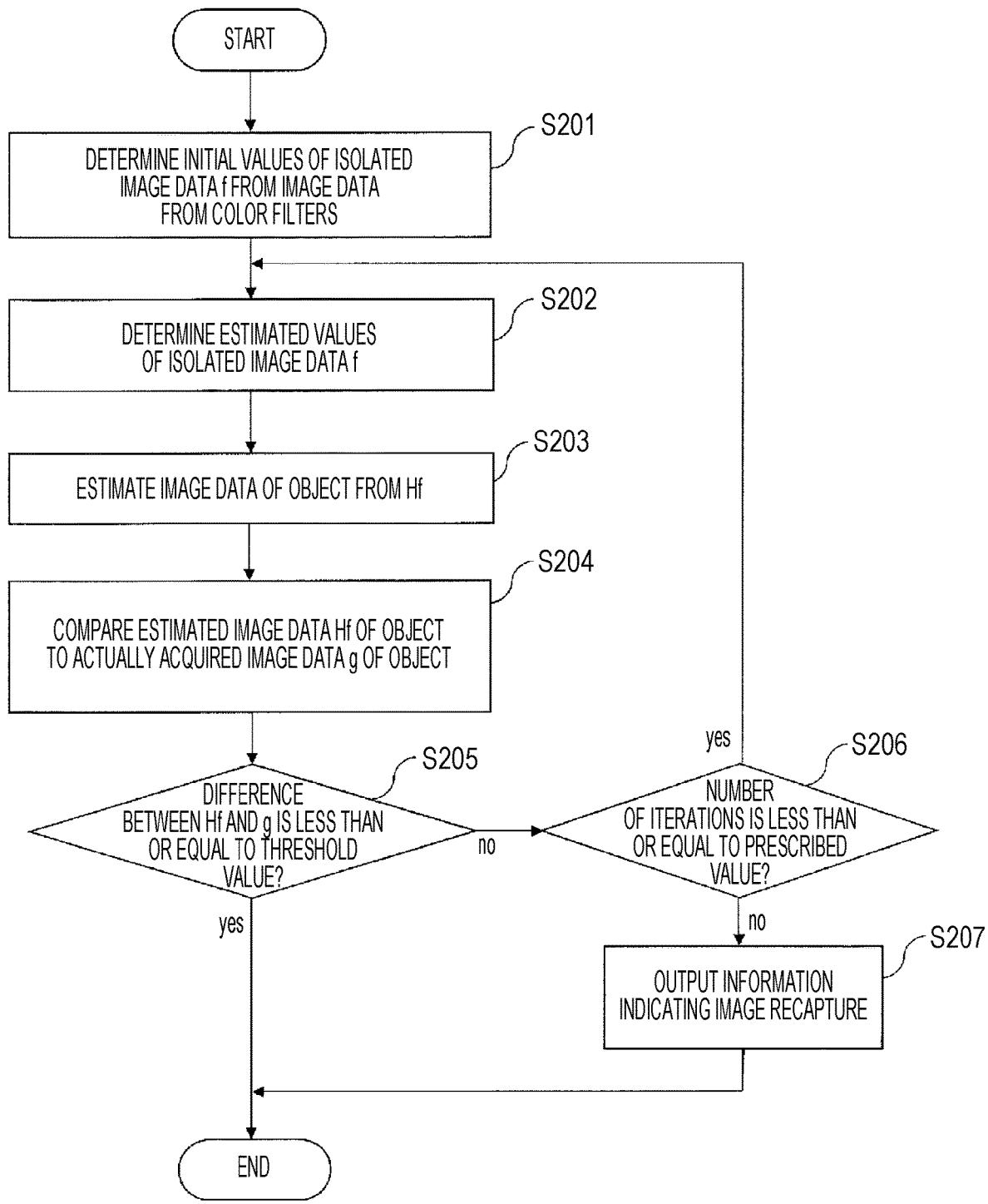
FIG. 7 is a flowchart of the operations in step S103 illustrated in FIG. 6.
Figure 8:
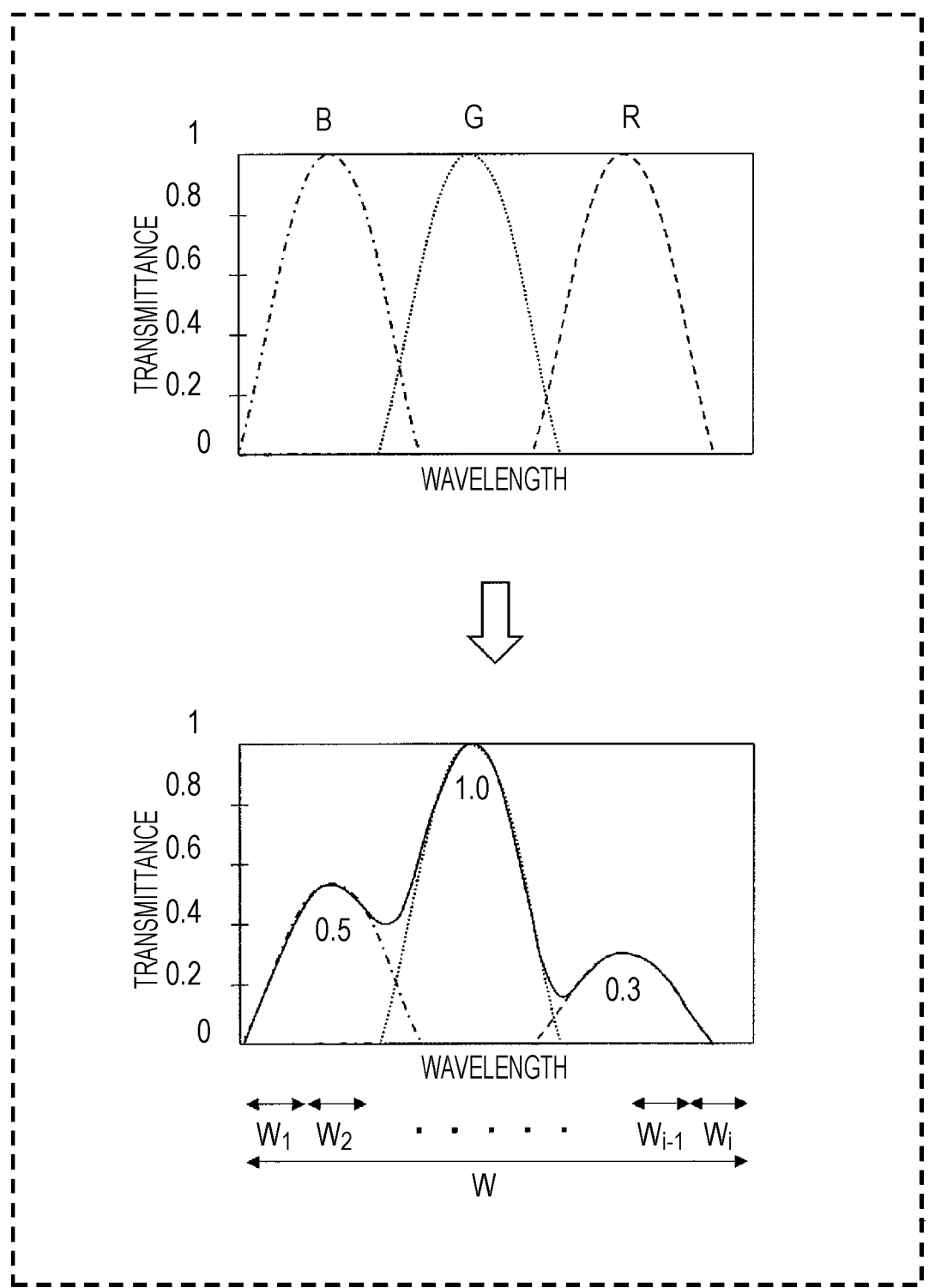
FIG. 8 is a diagram for explaining the operations in step S201 illustrated in FIG. 7.

Next, FIGS. 6 to 8 will be referenced to describe a method by which the signal processing circuit 200 generates image data. FIG. 6 is a flowchart of operations for generating image data. In step S101, the signal processing circuit 200 acquires the image data 120 of the object 80 from the image sensor 60. In step S102, the signal processing circuit 200 extracts, from the image data 120, image data acquired through the hyperspectral filters 10. In this specification, this image data is simply referred to as the "image data from the hyperspectral filters 10". In step S103, the signal processing circuit 200 generates the isolated image data 220. The method for generating the isolated image data 220 will be described later. Similarly, in step S104, the signal processing circuit 200 extracts, from the image data 120, image data acquired through the color filters 20. In this specification, this image data is simply referred to as the "image data from the color filters 20". In step S105, the signal processing circuit 200 generates the color image data 240.

The signal processing circuit 200 may execute steps S102 and S103 and steps S104 and S105 at the same time in parallel, or serially. The signal processing circuit 200 may execute steps S104 and S105 after executing steps S102 and S103, or execute steps S102 and S103 after executing steps S104 and S105. In steps S102 to S105, the signal processing circuit 200 generates the isolated image data 220 in accordance with detection signals from the light detecting elements that receive the light transmitted through the multiple types of hyperspectral filters and generates the color image data 240 in accordance with detection signals from the light detecting elements that receive the light transmitted through the multiple types of color filters 20 from among the light detecting elements in the image sensor.

In step S106, the signal processing circuit 200 generates high-resolution isolated image data 220 and/or high-resolution color image data 240. The method for generating the high-resolution image data will be described later.

Next, the method for generating the isolated image data 220 in step S103 illustrated in FIG. 6 will be described. The number of the images included in the isolated image data 220 may be a number greater than or equal to 3 and less than or equal to 100, for example. In this specification, the number of wavelength bands is also referred to as the "number of spectral bands". Depending on the purpose, the number of spectral bands may exceed 100.

If the isolated image data 220 that is the data to be obtained is designated f and the number of spectral bands is designated w, f is the data obtained by combining the image data $f_1$, $f_2$, ..., $f_w$ of each band. Provided that n is the number of pixels in the x direction and m is the number of pixels in the y direction of the data to be obtained, each of the data $f_1$, $f_2$, ..., $f_w$ is a set of n×m pixel two-dimensional data. Consequently, the data f is three-dimensional data containing n×m×w elements. On the other hand, if the image data 120 of the object 80 acquired by the coding and multiplexing performed by the filter array 100 is designated g, there are n×m elements in the data g. The data g in the present embodiment can be expressed by the following expression (1).

$$g = Hf = H\begin{bmatrix} f_1 \\ f_2 \\ \vdots \\ f_w \end{bmatrix} \quad (1)$$

Here, $f_1$, $f_2$, ..., $f_w$ are data including n×m elements. Consequently, the vector on the right-hand side is, strictly speaking, a one-dimensional vector with n×m×w rows and one column. The vector g is expressed by being converted into a one-dimensional vector with n×m rows and one column, and is calculated. The matrix H represents a transform that codes and intensity-modulates each component $f_1$, $f_2$, ..., $f_w$ of the vector f according to coding information that is different for each wavelength band, and then adds together the modulated components. Consequently, the H is a matrix with n×m rows and n×m×w columns.

Now that the vector g and the matrix H are given, it appears possible to calculate f by solving the inverse problem of expression (1). However, since the elements n×m×w in the data f to be obtained are more numerous than the elements n×m in the acquired data g, the above problem is an ill-posed problem and cannot be solved as-is. Accordingly, the signal processing circuit 200 according to the present embodiment uses redundancy in the image included in the isolated image data f to find a solution using compressed sensing. Specifically, the isolated image data f to be obtained is estimated by solving the following expression (2).

$$f' = \underset{f}{\operatorname{argmin}}\{\|g - Hf\|_{l_2} + \tau\Phi(f)\} \quad (2)$$

Here, f' represents the estimated data of f. The first term inside the curly brackets in the above expression represents the discrepancy between the estimation result Hf and the acquired data g, also referred to as the residual error. Here, the sum of squares is treated as the residual error, but a value such as the absolute value or the square root of the sum of squares may also be treated as the residual error. The second term inside the curly brackets is a regularization term or stabilization term described later. Expression (2) means that the f that minimizes the sum of the first term and the second term is obtained. The signal processing circuit 200 can converge on a solution by recursive iterative operations, and calculate a final solution f.

The first term inside the curly brackets in expression (2) means an operation of calculating the sum of squares of the difference between the acquired data g and Hf obtained by the system transformation of the provisionally estimated f by the matrix H. In the second term, Φ(f) is a constraint condition for regularization, and is a function reflecting information about the sparsity of the estimated data. The function works to smooth out or stabilize the estimated data. The regularization term may be expressed by, for example, the discrete cosine transform (DCT), the wavelet transform, the Fourier transform, or the total variation (TV) off. For example, in the case of using the total variation, stable estimated data can be acquired in which the influence of noise in the observed data g is suppressed. The sparsity of the object 80 in the space of each regularization term is different depending on the texture of the object 80. The regularization term may also be chosen such that the texture of the object 80 is sparser in the space of the regularization term. Alternatively, multiple regularization terms may be included in the calculation. Also, τ is a weighting factor. The larger the weighting factor τ, the more redundant data is removed, and the compression ratio rises. The smaller the weighting factor τ, the weaker is the convergence on a solution. The weighting factor τ is set to a suitable value such that f converges to some degree and is also not over-compressed.

To determine whether expression (2) has converged on a solution, it may be determined whether or not the difference between the estimation result Hf and the acquired data g is less than or equal to a threshold value. The difference is the mean square error (MSE) of the estimation result Hf and the acquired data g, and is expressed by the following expression (3).

$$MSE = \frac{1}{N \cdot M} \sum_{i=1}^{N} \sum_{j=1}^{M} (I'_{i,j} - I_{i,j})^2 \quad (3)$$

Here, N and M are the numbers of pixels in the vertical and horizontal directions, respectively. Also, $I_{i,j}$ is the pixel value of the image data g for the pixel at the position (i, j), and $I'_{i,j}$ is the pixel value of the estimated image data Hf for the pixel at the position (i, j). When the difference between the estimation result Hf and the acquired data g is less than or equal to the threshold value, it can be determined that the isolated image data f has been generated with good accuracy.

Note that although an example of operations using the compressed sensing indicated in expression (2) is illustrated here, a solution may also be found using another method. For example, another statistical method such as maximum likelihood estimation or Bayesian inference can be used. Also, there may be any number of the images included in isolated image data 220, and the wavelength bands may be set in any way. Details regarding a reconstruction method are disclosed in U.S. Patent Application No. 2016/138975.

FIG. 7 is a flowchart of the operations in step S103 illustrated in FIG. 6. In step S201, the signal processing circuit 200 determines initial values of the isolated image data f from the image data from the color filters 20. A method for determining the initial values will be described later. In step S202, the signal processing circuit 200 determines estimated values of the isolated image data f. In the first iteration, the estimated values of the isolated image data f are the initial values determined in step S201. In step S203, the signal processing circuit 200 estimates image data of the object 80 from Hf. In step S204, the signal processing circuit 200 compares the image data Hf of the object 80 estimated in step S203 to the actually acquired image data g of the object 80 in accordance with expression (3). In step S205, the signal processing circuit 200 determines whether the difference in expression (3) is less than or equal to a threshold value. In the case of a yes determination in step S205, the signal processing circuit 200 ends the operations. In the case of a no determination in step S205, in step S206 the signal processing circuit 200 determines whether the number of iterations is less than or equal to a prescribed value. In the case of a yes determination in step S206, the signal processing circuit 200 executes the operations in step S202 again. In the second and subsequent iterations, in step S202, the signal processing circuit 200 estimates the isolated image data f using expression (2). In the case of a no determination in step S206, in step S207 the signal processing circuit 200 outputs information indicating image recapture to a display or the like.

FIG. 8 is a diagram for explaining the operations in step S201 illustrated in FIG. 7. The upper graph in FIG. 8 schematically illustrates the transmission spectra of the R filter, G filter, and B filter. The transmission spectrum of each filter indicates a single wide peak at a peak wavelength. The signal strengths of the light transmitted through the R, G, and B filters in a certain unit block are assumed to be 0.3, 1.0, and 0.5, respectively. The lower graph in FIG. 8 schematically illustrates an example in which the transmission spectrum multiplied by the signal strength is superimposed. In the example illustrated in the lower graph of FIG. 8, the respectively averaged transmittance in the wavelength bands $W_1$ to $W_i$ can be treated as initial values for the estimated values of the isolated image data f in a certain pixel. In this way, initial values can be determined for the isolated image data $f_1, f_2, \ldots, f_w$ in all pixels. Note that instead of the averaged transmittance, the maximum or minimum transmittance in each of the wavelength bands $W_1$ to $W_i$ may be used, for example.

The speed of convergence by the recursive iterative operations and the accuracy of the solution depend on the initial values. If inappropriate initial values are chosen, the speed of convergence by the recursive iterative operations slows down, and the accuracy of the solution is also lowered. In contrast, if the initial values of the isolated image data are determined as above, the speed of convergence by the recursive iterative operations speeds up, and the accuracy of the solution is also raised.

Next, operations for generating the high-resolution isolated image data 220 and/or high-resolution color image data 240 in step S106 illustrated in FIG. 6 will be described. The signal processing circuit 200 generates respective chromaticity data from the isolated image data 220 in step S103 and the color image data 240 in step S105. The signal processing circuit 200 assigns the chromaticity data to the hyperspectral filter 10 and the color filters 20 in each unit block.

(Generation of High-Resolution Isolated Image Data 220)

The signal processing circuit 200 compares the chromaticity data in the color filters 20 to the chromaticity data in the nearby hyperspectral filters 10. If the chromaticity data is nearly the same, the signal processing circuit 200 complements the isolated image data 220 averaged across the nearby hyperspectral filters 10 as the isolated image data 220 in the color filters 20. If the chromaticity data in the color filters 20 is close to the chromaticity data in some of the nearby hyperspectral filters 10, but largely different from the chromaticity data in the other hyperspectral filters 10, the signal processing circuit 200 complements the isolated image data 220 in the hyperspectral filters 10 with the close chromaticity data as the isolated image data 220 in the color filters 20. In this way, high-resolution isolated image data 220 is generated.

(Generation of High-Resolution Color Image Data 240)

The signal processing circuit 200 generates color image data 240 from the chromaticity data in the hyperspectral filter 10 and the color filters 20 in each unit block. In this way, high-resolution color image data 240 is generated.

In images generated from the above high-resolution isolated image data 220 and high-resolution color image data 240, the border of the object 80 can be reproduced clearly.

[Image Data Generation Method 2]

Next, FIG. 9 will be referenced to describe another method by which the signal processing circuit 200 generates image data. FIG. 9 is another flowchart of operations for generating image data. Steps S301 to S305 and step S308 illustrated in FIG. 9 are the same as steps S101 to S106 illustrated in FIG. 6, respectively. Consequently, the operations in steps S306 and S307 will be described.

In step S306, the signal processing circuit 200 compares, in each pixel, the chromaticity data generated from the isolated image data 220 in step S303 to the chromaticity data generated from the color image data 240 in step S305. In step S307, the signal processing circuit 200 determines whether the difference between the two pieces of chromaticity data in each pixel is less than or equal to a threshold value, or in other words, whether the two pieces of chromaticity data substantially match in each pixel. In the case of a yes determination in step S307, the signal processing circuit 200 executes the operations in step S308. In the case of a no determination in step S307, the signal processing circuit 200 executes the operations in step S302 again. By repeating the operations in this way until the difference between the two pieces of chromaticity data is less than or equal to a threshold value, highly accurate isolated image data 220 can be acquired.

[Image Data Generation Method 3]

Figure 11A:
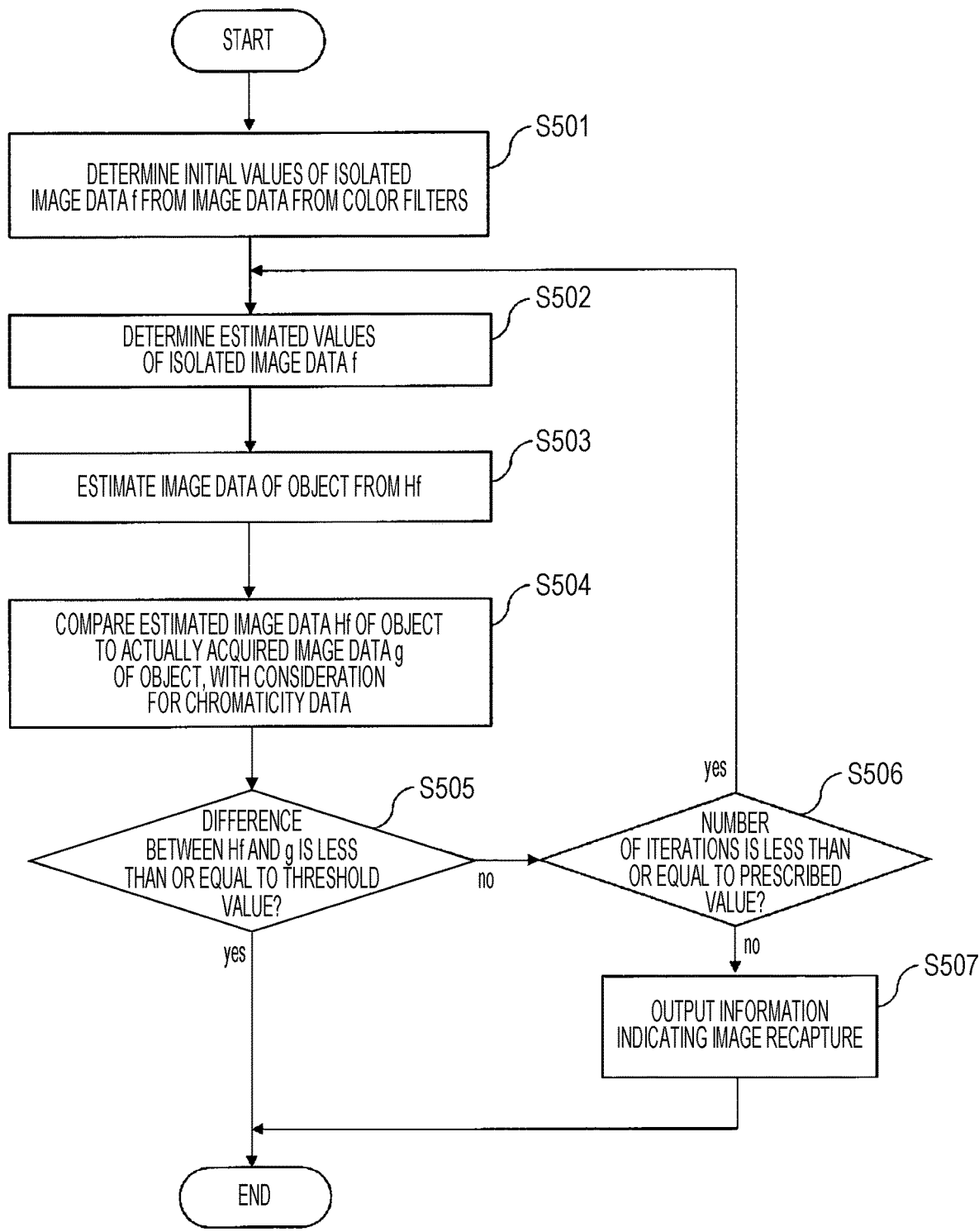
FIG. 11A is a flowchart of the operations in step S402 illustrated in FIG. 10.
Figure 11B:
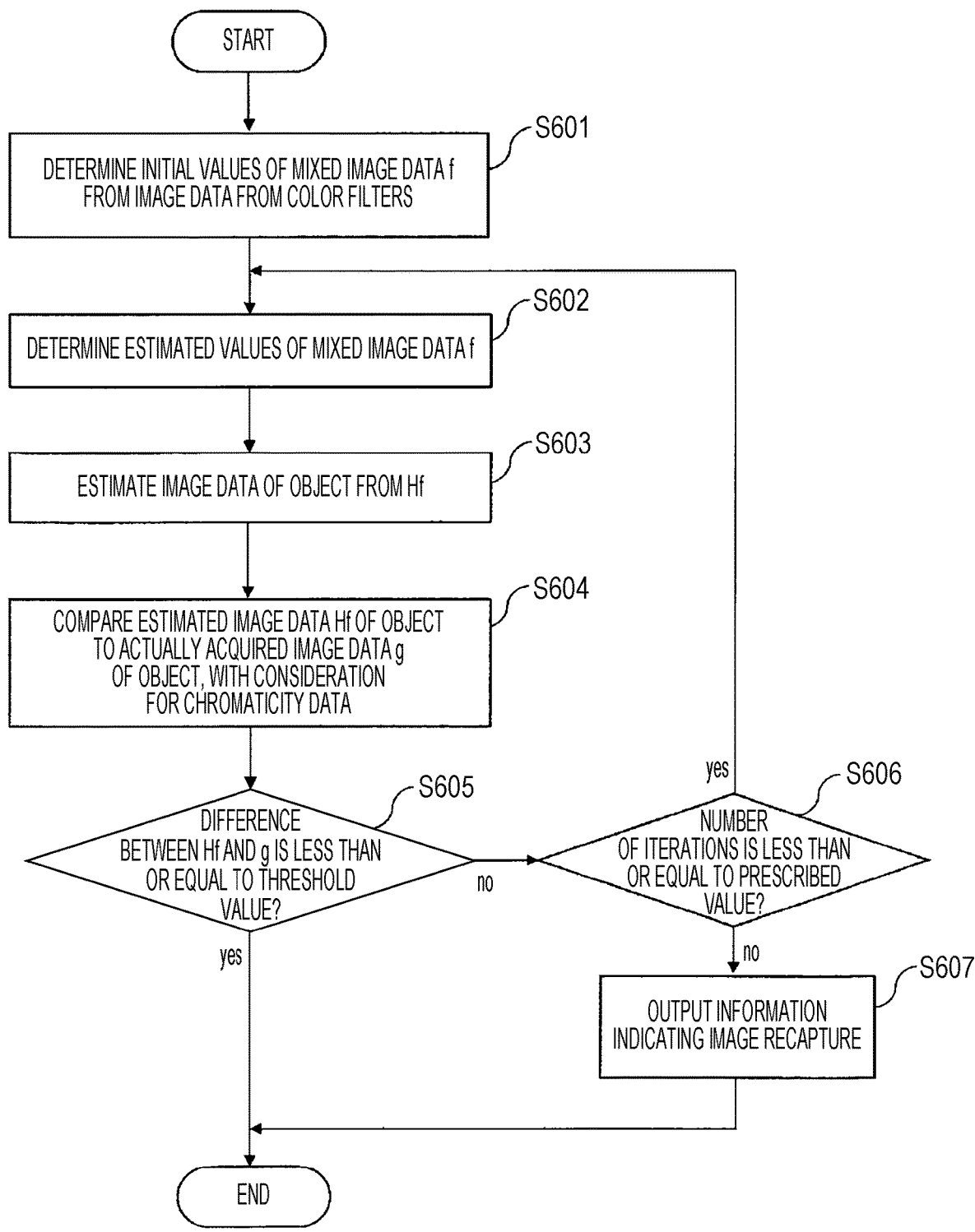
FIG. 11B is another flowchart of the operations in step S402 illustrated in FIG. 10.

Next, FIGS. 10 to 11B will be referenced to describe yet another method by which the signal processing circuit 200 generates image data. FIG. 10 is yet another flowchart of operations for generating image data. Step S401 illustrated in FIG. 10 is the same as step S101 illustrated in FIG. 6. In step S402, the signal processing circuit 200 generates the isolated image data 220 from both the image data from the hyperspectral filters 10 and the image data from the color filters 20 acquired from the image sensor 60.

FIG. 11A is a flowchart of the operations in step S402 illustrated in FIG. 10. Steps S501 to S503 and steps S505 to S507 illustrated in FIG. 11A are the same as steps S201 to S203 and steps S205 to S207 illustrated in FIG. 7, respectively. In step S504, the signal processing circuit 200 compares the estimated image data Hf of the object 80 to the actually acquired image data g of the object 80, with consideration for the chromaticity data generated from the estimated values of the isolated image data f and the chromaticity data generated from the color image data 240. Specifically, the square of the difference between the two pieces of quantified chromaticity data above is used as the regularization term Φ(f) in expression (2). By the operations in steps S504 and S505, the isolated image data 220 and the color image data 240 can be generated in a state in which the two pieces of chromaticity data are aligned across the entire image.

FIG. 11B is another flowchart of the operations in step S402 illustrated in FIG. 10. Step S601 and steps S603 to S607 illustrated in FIG. 11B are the same as step S501 and steps S503 to S507 illustrated in FIG. 11A, respectively. However, instead of the isolated image data f described above, mixed image data f including both the isolated image data $f_1, f_2, \ldots, f_w$ and color image data $f_R, f_G, f_B$ is used.

In step S602, the signal processing circuit 200 determines estimated values of the mixed image data f. In the three types of color filters 20, the R filter can be used to acquire red image data but not green or blue image data, the G filter can be used to acquire green image data but not red or blue image data, and the B filter can be used to acquire blue image data but not red or green image data. The signal processing circuit 200 determines estimated values of the isolated image data and also determines estimated values of the image data for the colors that cannot be acquired with each color filter 20. To estimate the image data for the colors that cannot be acquired from each color filter 20, image data for the colors acquired from nearby color filters 20 may be used. In this way, the isolated image data 220 and the color image data 240 may be generated using the mixed image data f.

<Structure of Hyperspectral Filters 10>

Figure 12A:
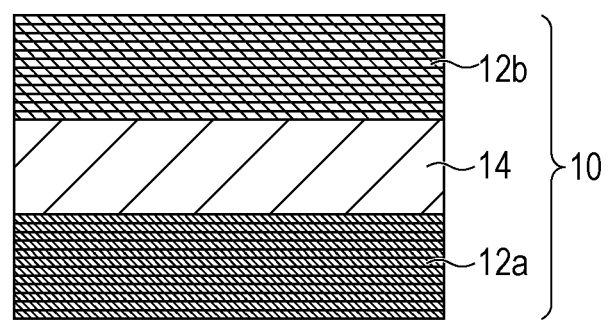
FIG. 12A is a sectional view schematically illustrating an example of the structure of the hyperspectral filter.
Figure 12B:
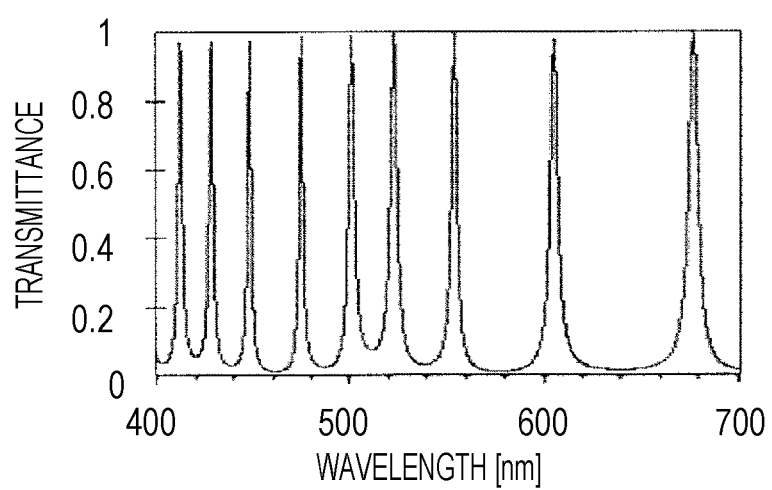
FIG. 12B is a diagram illustrating an example of the transmission spectrum of a Fabry-Perot filter with an angle of incidence $\theta=0°$.

Next, FIGS. 12A and 12B will be referenced to describe an example of one of the hyperspectral filters 10. FIG. 12A is a sectional view schematically illustrating an example of the structure of one of the hyperspectral filters 10. The hyperspectral filter 10 has a resonant structure. A resonant structure means a structure which light of a certain wavelength forms standing waves and exists stably inside the structure. This state of light is also referred to as a "resonant mode". The resonant structure illustrated in FIG. 12A includes a first reflection layer 12a, a second reflection layer 12b, and an intermediate layer 14 between the first and second reflection layers 12a and 12b. The first reflection layer 12a and/or the second reflection layer 12b may be formed using a dielectric multilayer film or a metal thin-film. The dielectric multilayer film has a multilayer structure in which $TiO_2$ layers and $SiO_2$ layers are stacked in alternation, for example. The intermediate layer 14 may be formed using a dielectric or a semiconductor that is transparent in a specific wavelength band. The intermediate layer 14 may be formed using at least one selected from the group consisting of Si, $Si_3N_4$, $TiO_2$, $Nb_2O_5$, and $Ta_2O_5$, for example. The refractive index and/or thickness of the intermediate layer 14 in the multiple types of hyperspectral filters 10 is different depending on the filter. The transmission spectrum of each of the multiple types of hyperspectral filters 10 has transmittance maxima at multiple peak wavelengths. The wavelengths respectively correspond to resonant modes of different order in the above resonant structure. In this specification, the hyperspectral filters 10 provided with the above resonant structure are also referred to as "Fabry-Perot filters".

Next, the transmission spectrum of the Fabry-Perot hyperspectral filter 10 will be described. In the Fabry-Perot hyperspectral filter 10, let L be the thickness of the intermediate layer 14, let n be the refractive index, let $\theta_i$ be the angle of incidence of light incident on the Fabry-Perot hyperspectral filter 10, and let m be the mode order of the resonant mode. Here, m is an integer greater than or equal to 1. In this case, the peak wavelength $\lambda_m$ of the Fabry-Perot hyperspectral filter 10 is expressed by the following expression (4).

$$\lambda_m = \frac{2nL}{m}\sqrt{1-\left(\frac{\sin\theta_i}{n}\right)^2} \tag{4}$$

Let $\lambda_i$ and $\lambda_e$ be the shortest and longest wavelengths, respectively, in the target wavelength band W. The number of m satisfying $\lambda_i \leq \lambda_m \leq \lambda_e$ corresponds to the number of peak wavelengths included in the transmission spectrum of the Fabry-Perot filter 10. The number of peak wavelengths depends on the refractive index n and/or the thickness L of the intermediate layer 14.

FIG. 12B is a diagram illustrating an example of the transmission spectrum of the Fabry-Perot filter 10 with an angle of incidence θ=0°. Provided that the shortest wavelength $\lambda_i$=400 nm and the longest wavelength $\lambda_e$=700 nm, in the example illustrated in FIG. 12B, the transmission spectrum exhibits nine peaks in the target wavelength band W.

(Modification of Filter Array 100)

Figure 13A:
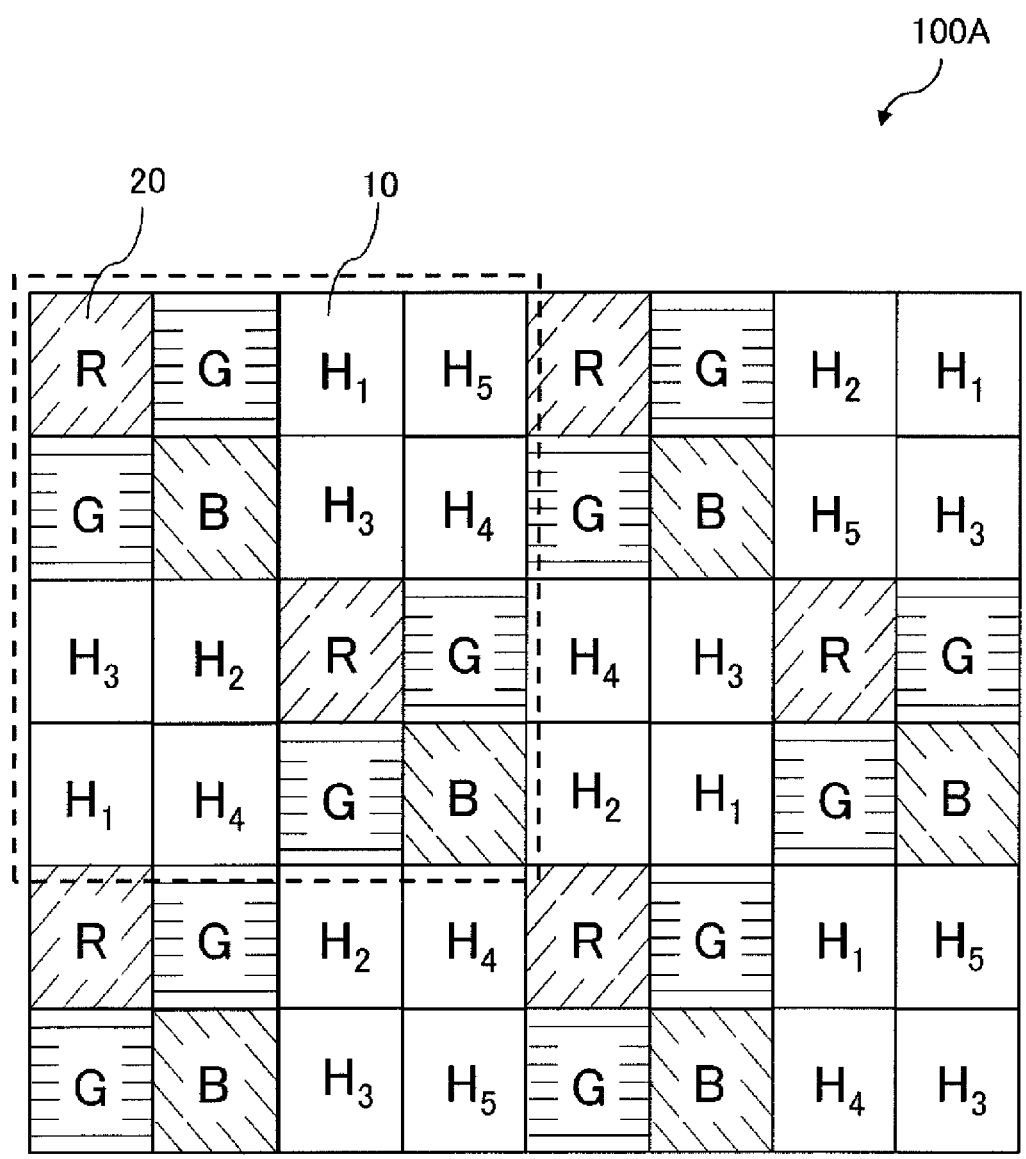
FIG. 13A is a diagram schematically illustrating a filter array in a first modification of the present embodiment.
Figure 13B:
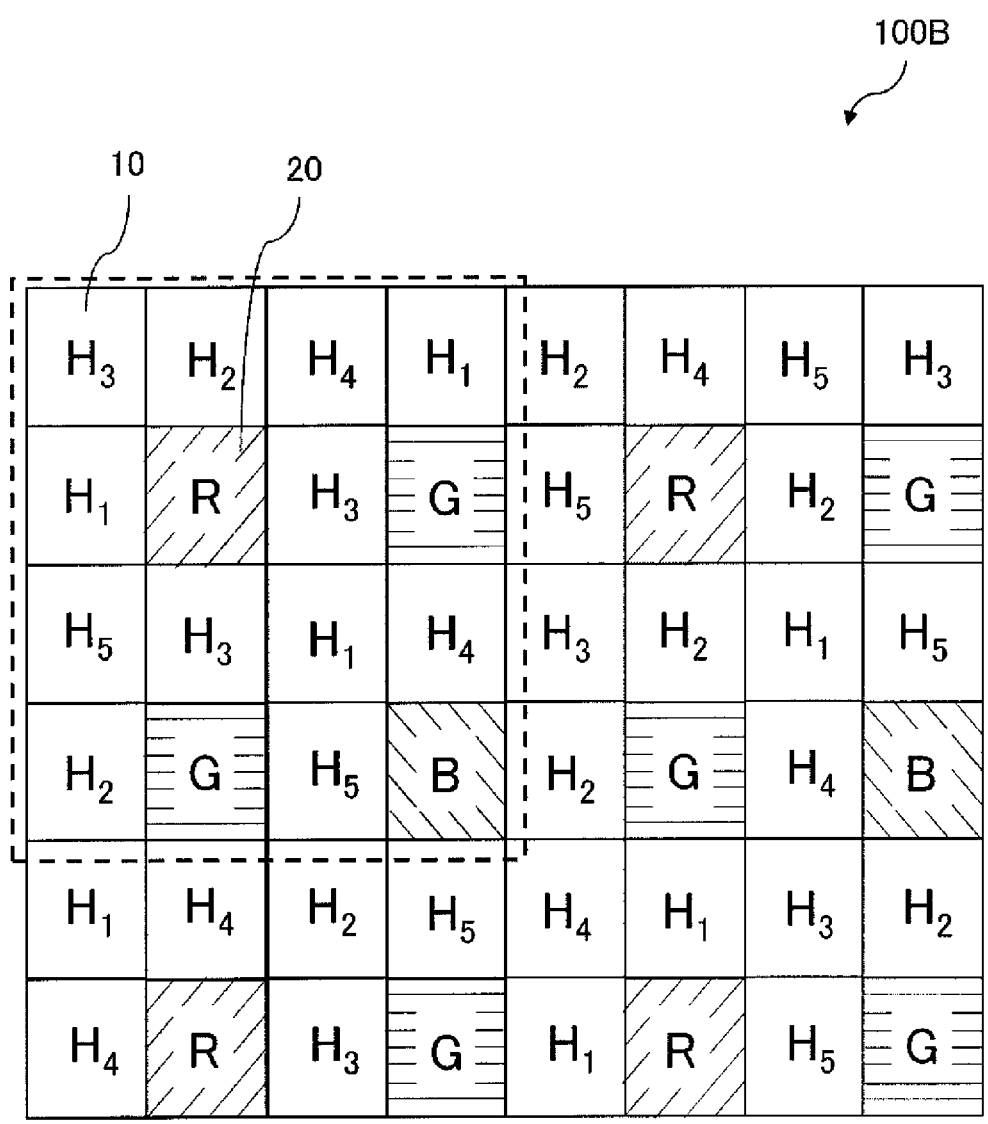
FIG. 13B is a diagram schematically illustrating a filter array in a second modification of the present embodiment.

Next, FIGS. 13A and 13B will be referenced to describe first and second modifications of the filter array 100 according to the present embodiment. FIG. 13A is a diagram schematically illustrating a filter array 100A in a first modification of the present embodiment. In the example illustrated in FIG. 13A, color filters 20 in a Bayes array are arranged two-dimensionally every two rows and two columns. Five types of hyperspectral filters 10 are arranged aperiodically between the color filters 20. The unit block enclosed by the thick dashed line includes eight hyperspectral filters 10 and eight color filters 20. The hyperspectral filters 10 and the color filters 20 are mixed in a 1:1 ratio. In the filter array 100A according to the first modification of the present embodiment, the ratio of the array occupied by the hyperspectral filters 10 is higher than in the filter array 100 according to the present embodiment. Consequently, multi-wavelength information can be obtained efficiently.

FIG. 13B is a diagram schematically illustrating a filter array 100B in a second modification of the present embodiment. In the example illustrated in FIG. 13B, the color filters 20 are arranged two-dimensionally every other filter to form a Bayes array. Five types of hyperspectral filters 10 are arranged aperiodically between the color filters 20. The unit block enclosed by the thick dashed line includes twelve hyperspectral filters 10 and four color filters 20. The hyperspectral filters 10 and the color filters 20 are mixed in a 3:1 ratio. In the filter array 100B according to the second modification of the present embodiment, the ratio of the array occupied by the hyperspectral filters 10 is even higher than in the filter array 100 according to the present embodiment. Consequently, multi-wavelength information can be obtained even more efficiently.

The filter array and light detection system according to the present disclosure is useful in cameras and measuring equipment that acquire multi-wavelength two-dimensional images. The filter array and light detection system according to the present disclosure are also applicable to biological, medical, and cosmetic sensing, foreign matter and residual pesticide inspection systems for food, remote sensing systems, in-vehicle sensing systems, and the like.

What is claimed is:

1. A filter array comprising:
   filters including a plurality of first groups of filters and a plurality of second groups of filters, the filters being arranged two-dimensionally, wherein:
   first transmission spectra of the plurality of first groups of filters are different from each other and each of the first transmission spectra includes first peaks,
   second transmission spectra of the plurality of second groups of filters are different from each other and each of the second transmission spectra includes one or more second peaks,
   a total number of the first peaks included in each of the first transmission spectra is greater than a total number of the one or more second peaks included in each of the second transmission spectra,
   filters in a same group among the plurality of first groups of filters have a same first transmission spectrum, and the filters having the same first transmission spectrum are arranged aperiodically, and
   filters in a same group among the plurality of second groups of filters have a same second transmission spectrum, and the filters having the same second transmission spectrum are arranged periodically.

2. The filter array according to claim 1, wherein
   the total number of the first peaks included in each of the first transmission spectra is greater than or equal to 3, and
   the total number of the one or more second peaks included in each of the second transmission spectra is 1 or 2.

3. The filter array according to claim 1, wherein a full width at half maximum of each of the first peaks is narrower than a full width at half maximum of each of the one or more second peaks.

4. The filter array according to claim 3, wherein two or more wavelength ranges corresponding to two or more peaks included in the first peaks included in each of the first transmission spectra overlap a set of (i) one or more wavelength ranges corresponding to one or more second peaks included in one of the second transmission spectra and (ii) one or more wavelength ranges corresponding to one or more second peaks in a transmission spectrum included in the second transmission spectra and different from the one of the second transmission spectra.

5. The filter array according to claim 1, wherein one or more transmission spectra included in the first transmission spectra each include a transmittance maximum in a wavelength band greater than or equal to 700 nm and less than or equal to 2500 nm.

6. The filter array according to claim 1, wherein a number of groups of the plurality of second groups of filters is three.

7. The filter array according to claim 6, wherein the plurality of second groups of filters include a group into which a filter mainly transmitting light in a red wavelength band is classified, a group into which a filter mainly transmitting light in a green wavelength band is classified, and a group into which a filter mainly transmitting light in a blue wavelength band is classified.

8. The filter array according to claim 1, wherein a number of the plurality of first groups of filters is 10 or more and 50 or less.

9. The filter array according to claim 1, wherein each filter of the plurality of first groups of filters has a resonant structure including a first reflection layer, a second reflection layer, and an intermediate layer between the first reflection layer and the second reflection layer.

10. A light detection system comprising:
    the filter array according to claim 1;
    an image sensor including light detecting elements; and
    a signal processing circuit, wherein
    each of the light detecting elements is disposed at a position for receiving light transmitted through a corresponding filter from among the filters, and
    the signal processing circuit
    generates first image data in accordance with first detection signals from light detecting elements that receive light transmitted through the first filters and are included in the light detecting elements, and
    generates second image data in accordance with second detection signals from light detecting elements that receive light transmitted through the second filters and are included in the light detecting elements.

11. The light detection system according to claim 10, wherein the signal processing circuit
generates first chromaticity data in accordance with the first image data, and
generates second chromaticity data in accordance with the second image data.

12. The filter array according to claim 1,
wherein the first peaks included in each of the first transmission spectra are included in a predetermined wavelength band, and
wherein the one or more second peaks included in each of the second transmission spectra are included in a predetermined wavelength band.

13. The light detection system according to claim 11, wherein
the first image data includes first pixels,
the second image data includes second pixels,
the first pixels correspond to the second pixels,
pieces of the first chromaticity data correspond to the first pixels,
pieces of the second chromaticity data correspond to the second pixels, and
the pieces of the first chromaticity data substantially match the pieces of the second chromaticity data.

14. The filter array according to claim 1, wherein
the first filters and the second filters are disposed in a mixed arrangement, and
the mixed arrangement comprises:
a state in which one or more of the first filters are interposed between two of the second filters in a row direction or a column direction,
or a state in which one or more of the second filters are interposed between two of the first filters in the row direction or the column direction.

* * * * *

UNITED STATES PATENT AND TRADEMARK OFFICE
CERTIFICATE OF CORRECTION

PATENT NO. : 12,250,475 B2  
APPLICATION NO. : 17/718428  
DATED : March 11, 2025  
INVENTOR(S) : Yasuhisa Inada et al.

Page 1 of 1

It is certified that error appears in the above-identified patent and that said Letters Patent is hereby corrected as shown below:

On the Title Page

Under (54), and in the Specification, Column 1, Lines 1-4, the Title should be:
FILTER ARRAY INCLUDING MULTIPLE TYPES OF FILTERS ARRANGED IN MATRIX AND LIGHT DETECTION SYSTEM INCLUDING THE SAME

Signed and Sealed this  
Twenty-ninth Day of April, 2025

Coke Morgan Stewart  
*Acting Director of the United States Patent and Trademark Office*